United States Patent
Otsuka et al.

(10) Patent No.: US 7,313,980 B2
(45) Date of Patent: Jan. 1, 2008

(54) OPERATING POSITION SELECT DEVICE FOR AUTOMATIC TRANSMISSION

(75) Inventors: Takashi Otsuka, Tokyo (JP); Yukitsugu Hirota, Tokyo (JP); Kensuke Osamura, Tokyo (JP); Masaharu Nagano, Tokyo (JP); Shinya Kobayashi, Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 199 days.

(21) Appl. No.: 11/248,609

(22) Filed: Oct. 13, 2005

(65) Prior Publication Data
US 2006/0081085 A1 Apr. 20, 2006

(30) Foreign Application Priority Data
Oct. 15, 2004 (JP) ............................ 2004-301826
Jan. 24, 2005 (JP) ............................ 2005-016080

(51) Int. Cl.
- F16H 59/00 (2006.01)
- F16H 61/00 (2006.01)
- F16H 63/00 (2006.01)
- B60K 17/04 (2006.01)
- B60K 17/12 (2006.01)

(52) U.S. Cl. .................. 74/335; 74/473.12; 74/473.21

(58) Field of Classification Search .................. 74/335, 74/473.12–473.15, 473.21
See application file for complete search history.

(56) References Cited

U.S. PATENT DOCUMENTS 6,637,281 B2* 10/2003 Yamamoto .................. 74/335
7,194,927 B2* 3/2007 Kozu et al. ............... 74/473.12
2006/0011003 A1* 1/2006 Osamura et al. ............... 74/335

FOREIGN PATENT DOCUMENTS

| EP | 1 437 533 A1 | 7/2004 |
|---|---|---|
| EP | 1 519 083 A1 | 3/2005 |
| JP | 60-256649 A | 12/1985 |
| JP | 05-087237 A | 4/1993 |
| JP | 9-323559 A | 12/1997 |
| JP | 2003-97694 A | 4/2003 |

* cited by examiner

*Primary Examiner*—Tisha D. Lewis
(74) *Attorney, Agent, or Firm*—Foley & Lardner LLP

(57) ABSTRACT

An operating position select device has a select lever unit, a mode shift unit to shift operation modes of the automatic transmission, and an assist actuator controlled by a control unit. A first connecting member of the select lever and a second connecting member of the mode shift unit are relatively movable to a limit amount to each other and integrally movable beyond the limit amount with each other. The positions of the members are detected by an operating position sensor and an assist position sensor, respectively. The actuator is driven so that a difference between an operating position and an assist position may be reduced, but prohibited from driving when the difference is kept out of a permissible range for a predetermined period during rest of the actuator.

7 Claims, 22 Drawing Sheets

OPERATING POSITION SELECT DEVICE FOR AUTOMATIC TRANSMISSION

BACKGROUND OF THE INVENTION

1. Field of the Invention

The present invention relates to an operating position select device for an automatic transmission by which a driver can select by operating a select lever one of select mode positions corresponding to a plurality of operation modes of the automatic transmission.

2. Description of the Related Art

An operating position select device for an automatic transmission of this kind is disclosed in Japanese patent laying-open publication (Tokkaihei) No. 9-323559. This select device includes a select lever unit disposed near a driver's seat in a passenger compartment and a mode shift unit mounted on an automatic transmission. The select lever unit has a select lever manually operated by a driver and is connected with the mode shift unit by a connecting mechanism, such as a control cable, or a connecting linkage, which transmits an operating force applied on the select lever by the driver to the mode shift unit to shift operation modes of the automatic transmission.

The conventional art, however, has a problem that the select lever unit needs a long select lever in order to operate it without a large operating force of the driver, which reduces design freedom concerning an installation location of the select lever unit and/or a layout of a passenger compartment.

This reason comes from the fact that a length of the select lever is determined so that a driver can easily operate the select lever and its operating torque must overcome frictional resistance of the connecting mechanism and the like. Namely, the operating torque, generated by the operating force on the select lever, has to be larger than torque caused by the sum of the frictional resistance in the connecting mechanism and resistance generated when a detent pin, which moves with the select lever, gets over a cam top portion of a detent plate during select operation, although the operating force of the driver is limited to a certain extent. Accordingly, to satisfy both of the above requirements the select lever needs to be longer than a certain length, typically to be 350 mm.

Another operating position select device for an automatic transmission of this kind is disclosed in Japanese patent laying-open publication (Tokkai) No. 2003-97694. This select device is, what is called, a shift-by-wire type one. It has a select lever manually operated by a driver, a select position detector for detecting a position of the select lever, a mode shift unit mounted on an automatic transmission for shifting its operation modes, an electric motor for driving a mode shift unit, and a control unit for controlling the electric motor based on an output signal from the detector.

This select device is suitable for shortening a length of the select lever and expanding design freedom for its installation location and/or layout of a passenger compartment, while the select device lacks a mechanical connection between the select lever and the mode shift unit. This lack of the mechanical connection results in a problem that the mode shift unit can not be sifted despite of operating the select lever in case of electrical failure such that an electric wire is broken, or the select position detector or the control unit fails.

It is, therefore, an object of the present invention to provide an operating position select device for an automatic transmission which overcomes the foregoing drawbacks and can expand design freedom concerning layout of a passenger compartment and/or an installation location of a select lever unit, and drive a mode shift unit despite of electric failure of the operating position select device, providing an on-demand favorable select-lever operating feeling in a select operation.

SUMMARY OF THE INVENTION

According to the first aspect of the present invention there is provided an operating position select device for an automatic transmission whose operation modes are shiftable, the operating position select device comprising a select lever unit having a select lever that is operated by a driver between a plurality of select positions corresponding to the operation modes, a first connecting member mechanically connected with and movable with the select lever; an operating position sensor detecting an operating position of the select lever, a mode shift unit mounted on the automatic transmission to shift operation modes of the automatic transmission, a second connecting member mechanically connected with the mode shift unit to shift positions thereof, the second connecting member being relatively movable to a limit amount with respect to the first connecting member and integrally movable beyond the limit amount with the first connecting member, an assist sensor detecting an assist position of the mode shift unit, an assist actuator supplying assist force to the mode shift unit, a drive command value calculating means calculating a drive command value for driving the assist actuator based on the operating position and the assist position so that a difference between the operating position and the assist position may be reduced, and a drive prohibiting means for prohibiting drive of the assist actuator when the difference is kept out of a permissible range for a predetermined period during rest of the assist actuator.

According to the second aspect of the present invention there is provided an operating position select device for an automatic transmission whose operation modes are shiftable, the operating position select device comprising a select lever unit having a select lever that is operated by a driver between a plurality of select positions corresponding to the operation modes, a first connecting member mechanically connected with and movable with the select lever; an operating position sensor detecting an operating position of the select lever, a mode shift unit mounted on the automatic transmission to shift operation modes of the automatic transmission, a second connecting member mechanically connected with the mode shift unit to shift positions thereof, the second connecting member being relatively movable to a limit amount with respect to the first connecting member and integrally movable beyond the limit amount with the first connecting member; an assist position sensor detecting an assist position of the mode shift unit, a shifted operating position sensor detecting a shifted operating position of the automatic transmission; an assist actuator supplying assist force to the mode shift unit, a drive command value calculating means calculating a drive command value for driving the assist actuator based on the operating position and the assist position so that a difference between the operating position and the assist position may be reduced, and a drive prohibiting means for prohibiting drive of the assist actuator when a difference between the shifted operating position and one of the operating position and the assist position is kept out of a permissible range for a predetermined period during rest of the assist actuator.

According to the third aspect of the present invention there is provided an operating position select device for an automatic transmission whose operation modes are shiftable, the operating position select device comprising a select lever unit having a select lever that is operated by a driver between a plurality of select positions corresponding to the operation modes, a first connecting member mechanically connected with and movable with the select lever, an operating position sensor detecting an operating position of the select lever; a mode shift unit mounted on the automatic transmission to shift operation modes of the automatic transmission, a second connecting member mechanically connected with the mode shift unit to shift positions thereof, the second connecting member being relatively movable to a limit amount with respect to the first connecting member and integrally movable beyond the limit amount with the first connecting member; an assist sensor detecting an assist position of the mode shift unit, a shifted operating position sensor detecting a shifted operating position of the automatic transmission, an assist actuator supplying assist force to the mode shift unit, a drive command value calculating means calculating a drive command value for driving the assist actuator based on the operating position and the assist position so that a difference between the operating position and the assist position may be reduced, and a drive prohibiting means for prohibiting drive of the assist actuator when a difference between the shifted operating position and one of the operating position and the assist position is kept out of a permissible range for a predetermined period during rest of the assist actuator.

Therefore, these operation position select devices can expand design freedom concerning layout of a passenger compartment and/or an installation location of a select lever unit. In addition, it can drive the mode shift unit despite of electric failure of the operating position select device and providing an on-demand favorable select-lever operating feeling in a select operation.

Preferably, one of the first connecting member and the second connecting member is provided with a projection and the other of the first connecting member and the second connecting member is formed with a play opening in which the projection is inserted, and wherein the play opening is defined by two wall portions arranged apart in a moving direction of the select lever so that the projection is apart from the wall portions in a normal select operation and contacts with one of the wall portions to transmit operating force from the select lever to the mode shift unit when in an abnormal select operation.

Preferably, the shifted operating position sensor is an inhibitor switch of the automatic transmission.

BRIEF DESCRIPTION OF THE DRAWINGS

The objects, features and advantages of the present invention will become apparent as the description proceeds when taken in conjunction with the accompanying drawings, in which:

FIG. 10A shows a case where a variation between the angles is kept within a permissible range after rest of the assist actuator, and FIG. 10B shows a case where the variation is out of the permissible range after the rest of the assist actuator;

DETAILED DESCRIPTION OF THE PREFERRED EMBODIMENTS

Figure 1:
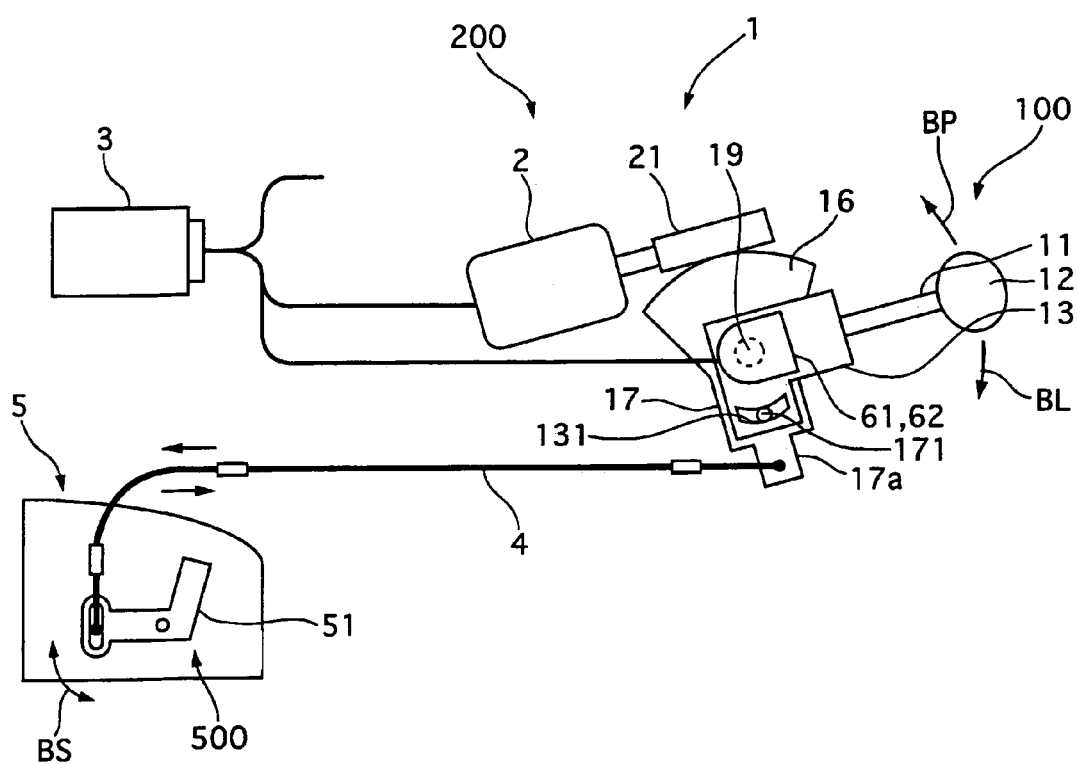
FIG. 1 is a schematic diagram showing a structure of an automatic transmission with an operating position select device of a first embodiment according to the present invention.

Throughout the following detailed description, similar reference characters and numbers refer to similar elements in all figures of the drawings, and their descriptions are omitted for eliminating duplication.

An operating position select device of a first preferred embodiment according to the present invention will be described with reference to the accompanying drawings.

Referring to FIG. 1 of the drawing, there is shown an automatic transmission 5 and an operating position select device 1 for controlling the transmission 5.

The automatic transmission 5 is a conventional multi-speed transmission with a plurality of planetary gear sets, not shown, and is shiftable among a plurality of operation modes, for example, a parking mode, a reverse drive mode, a neutral mode, a forward drive mode, and a forward low gear drive mode.

The automatic transmission 5 is provided with the operating position select device 1, which is able to shift the operation modes to a desired operation mode by manually selecting a select lever 11 of the select device 1.

The operating position select device 1 includes the select lever unit 100 manually operated by a driver, a mode shift unit 500 mounted on the automatic transmission 5, a control cable 4 transmitting operating force between the select lever 11 and the mode shift unit 500, an assist actuator 200 for assisting a select operation of the select lever 11, and a control unit 3 for controlling the assist actuator 200.

The select lever unit 100 is arranged at a center console, an instrumental panel or the like within arm's reach of the driver. The unit 100 is equipped with the select lever 11 operatable by the driver and a checking mechanism 14, shown in FIG. 2, for ensuring the lever 11 to be kept in a selected mode position. The lever 11 is swingably supported by a supporting shaft 19 supported by a not-shown support plate fixed to a vehicle body side, and on its top portion, a knob 12 is mounted for grip of a hand of the driver.

The select lever 11 is set to be approximately 100 mm in length in this embodiment, approximately 250 mm shorter than a conventional type select lever. The lever 11 is movable by the driver swingably in a first direction toward a P position as indicated by an arrow B$_P$ in FIG. 1 and in a second direction, opposite to the first direction, toward an L position as indicated by an arrow B$_L$.

The operation modes of the automatic transmission 5 can be shifted by moving the select lever 11 in one of select positions: the P position corresponding to the parking mode of the automatic transmission 5, an R position corresponding to the reverse drive mode, an N position corresponding to the neutral mode, a D position corresponding to the forward drive mode, and the L position corresponding to the forward low geared drive mode.

Figure 2:
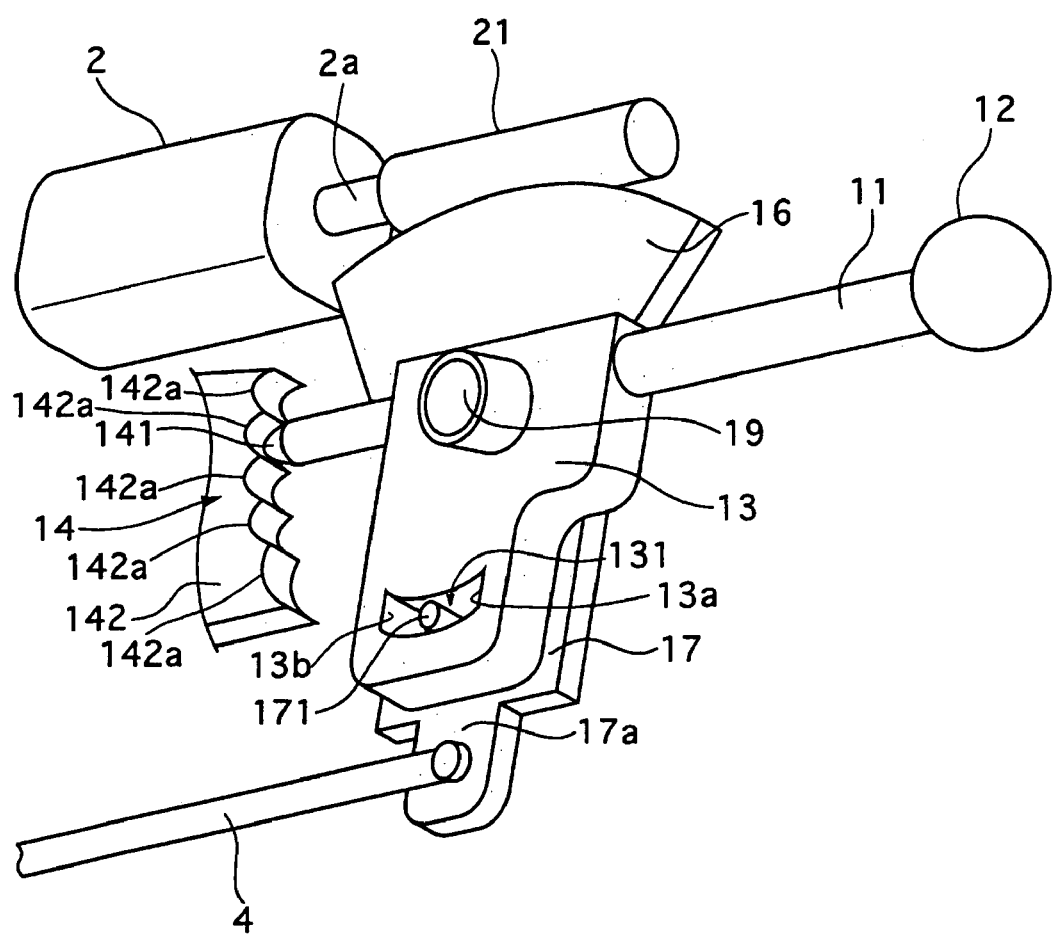
FIG. 2 is an enlarged perspective view showing a select lever unit and an assist actuator which are used in the operating position select device shown in FIG. 1.

As shown in FIG. 2, the select lever 11 is integrally fixed to a first connecting member 13 at its intermediate portion. The first connecting member 13 is swingably rotatable around the supporting shaft 19 and formed with a play opening 131 in an arc shape. This play opening 131 is formed, being centered on the supporting shaft 19.

The shaft 19 also swingably supports a second connecting member 17, which is lapped over the first connecting member 13. The second connecting member 17 is provided with a worm wheel portion 16 at its top end portion and an attachment portion 17a at its bottom end portion. The worm wheel portion 16 is in mesh with a worm 21 fixed on an output shaft 2a of an electric motor 2 of the assist actuator 200, and the attachment portion 17a is connected with an one end portion of the control cable 4.

The second connecting member 17 is further provided at its intermediate portion with a projection 171 inserted in the play opening 131 of the first connecting member 13 so that the projection 171 can move relative to the opening 131 in a limited travel range, where the projection 171 does not contact with a wall portion 13a or 13b forming the play opening 131. In other words, the first and second connecting members 13 and 17 can move independently from each other in the limited travel range where the projection 171 is not in contact with the wall portion 13a or 13b of the play opening 131, while they moves integrally with each other out of the range, the projection 171 contacting with the wall portion 13a or 13b.

The checking mechanism 14 includes a check plate 142 in a wave shape with five bottom portions 142a, which are formed corresponding to the select mode positions P, R, N, D, and L. The check plate 142 is fixed to the vehicle body side and pressed by a check pin 141, which is extractable from and retractable into a not-shown hole formed in the first connecting member 13, being urged by a not-shown spring arranged in the hole. The select lever 11 is kept being positioned in a selected mode position by engagement of the check pin 141 and the bottom portion 142a corresponding thereto, regardless of vibration force transmitted from the vehicle body and others.

The assist actuator 200, as shown in FIGS. 1 and 2, includes the electric motor 2 with reduction gears for reducing rotation speed of the output shaft 2a of the motor 2, the worm 121 formed on the outer peripheral surface of the output shaft 2a and meshing with worm wheel 14. The electric motor 2 is controlled by the control unit 3 so as to apply assist force to the second connecting member 17 or rest.

As shown in FIG. 1, at the supporting shaft 19, there are provided an operating angle sensor 61 for detecting an operating angle of the first connecting member 13 connected with the select lever 11 and an assist angle sensor 62 for detecting an assist angle of the second connecting member 17 connected with the mode shift unit 500. The operating angle sensor 61 detects the operating angle based on a relative angle between the first connecting member 13 and the support plate, and then outputs' an operating angle signal to the control unit 3. The assist angle sensor 62 detects the assist angle based on a relative angle between the second connecting member 17 and the support plate, and then outputs an assist angle signal to the control unit 3.

The operating angle of the first connecting member 13 is substantially equal to that of the select lever 11, since they are joined with each other. Similarly, the assist angle of the second connecting member 17 is substantially equal to that of the mode shift unit 500, since they are joined with each other.

The operating angle sensor 61 acts as an operating position sensor of the present invention, and the assist angle sensor 62 acts as an assist position sensor 62. By using the operating angle sensor 61 and the assist angle sensor 62, a relative angle between the first and second connecting members 61 and 62 can be obtained by subtraction between the operating angle and the assist angle.

Figure 3:
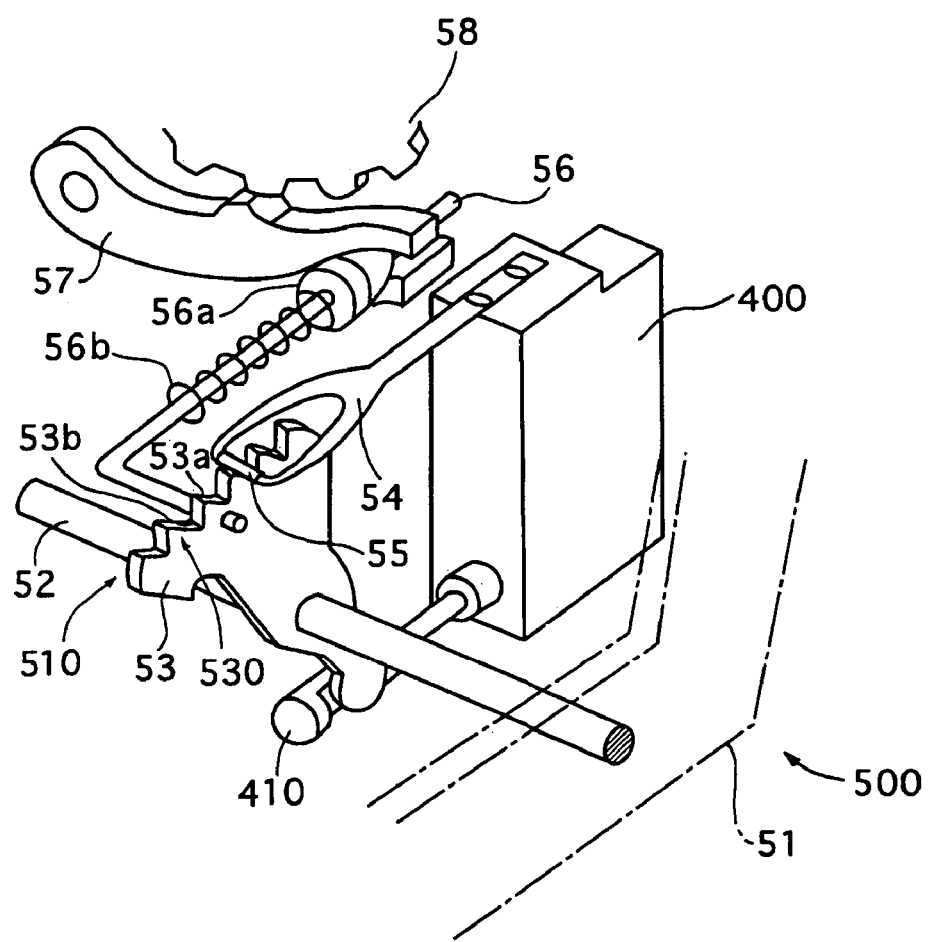
FIG. 3 is an enlarged perspective view showing a mode shift unit with a detent mechanism, which is used in the operating position select device shown in FIG. 1.

The mode shift unit 500 is constructed to shift the operation modes of the automatic transmission 5 according to an operation of the select lever 11. Referring to FIGS. 1 and 3 of the drawings, the mode shift unit 500 has a manual plate lever 51 and a detent mechanism 510 for keeping the manual plate lever 51 in a position selected by the select lever 11.

The manual plate lever 51 is integrally fixed at its intermediate portion with a rotary shaft 52, and connected with the other end portion of the control cable 4 at its one end portion, so that the second connecting member 17 can rotate the rotary shaft 52 relative to a transmission case of the transmission 5 through the cable 4 according to a select operation of the select lever 11. Incidentally, the rotary shaft 52 is integrally fixed to a detent plate 53 of the detent mechanism 510, so that they rotates together with each other.

The detent mechanism 510 includes the detent plate 53 having a cam 530 on its top portion, a detent pin 55 to be pressed onto the cam 530, and a spring plate 54 acting its spring force on the pin 55.

The detent plate 53 is mechanically connected at its bottom portion with a valve spool 410 of a not-shown manual valve disposed in a control valve unit 400 of the automatic transmission 5 so as to move the spool 410 according to a selected position. The detent plate 53 is formed on its upper portion with the cam 530 having six top portions 53a and five bottom portions 53b. Each bottom portion 53b is arranged between the adjacent top portions 53a and corresponds with one of the five operation modes of the automatic transmission 5.

The cam 530 is pressed by the detent pin 55 that is urged by the spring plate 54. The spring plate 54 is mounted at its one end portion on the control valve unit 400 and supports the detent pin 55 at its other end portion. The detent plate 53 is kept being positioned by engagement of the detent pin 55 and the selected bottom portion 53b, thereby detaining the valve spool 410 in the correspondent position.

The detent plate 53 is also coupled at its cam side portion with a parking rod 56 having a wedge 56a. The wedge 56a is mounted on and movable along the rod 56, and formed with a tapered surface to press a parking pawl 57, when the wedge 56a advances, toward a parking wheel 58 united with an output shaft of the automatic transmission 5. The wedge 56a is biased by a coil spring 56b so that it may advance to apply its force to the pawl 57 and boost engagement of the pawl 57 and the parking wheel 58 when the select lever 11 is shifted to the P position. This engagement of the pawl 57 and the wheel 58 results in locking drive wheels, not shown, for parking a motor vehicle.

As shown in FIG. 1, the control unit 3 is electrically connected to a not-shown battery, the operating angle sensor 61, and the assist angle sensor 62. The control unit 3 receives the operating angle signal from the operating angle sensor 61 and the assist angle signal from the assist angle sensor 62 so as to compute a relative angle, and drives the electric motor 2 under pulse width modulation (PWM) control.

The operating angle sensor 61 detects an operating angle $A_{OP}$, and the assist angle sensor 62 detects an assist angle $A_{SP}$. The operating angle $A_{OP}$ is an angle of the first connecting member 13 relative to the support plate, corresponding to that of the select lever 11. The assist angle $A_{SP}$ is an angle of the second connecting member 17, corresponding to that of the manual plate lever 51 of the mode shift unit 500. By subtracting the assist angle $A_{SP}$ from the operating angle $A_{OP}$, a relative angle between the first and second connecting members 13 and 17 can be obtained and used for determining a drive command value.

Figure 4:
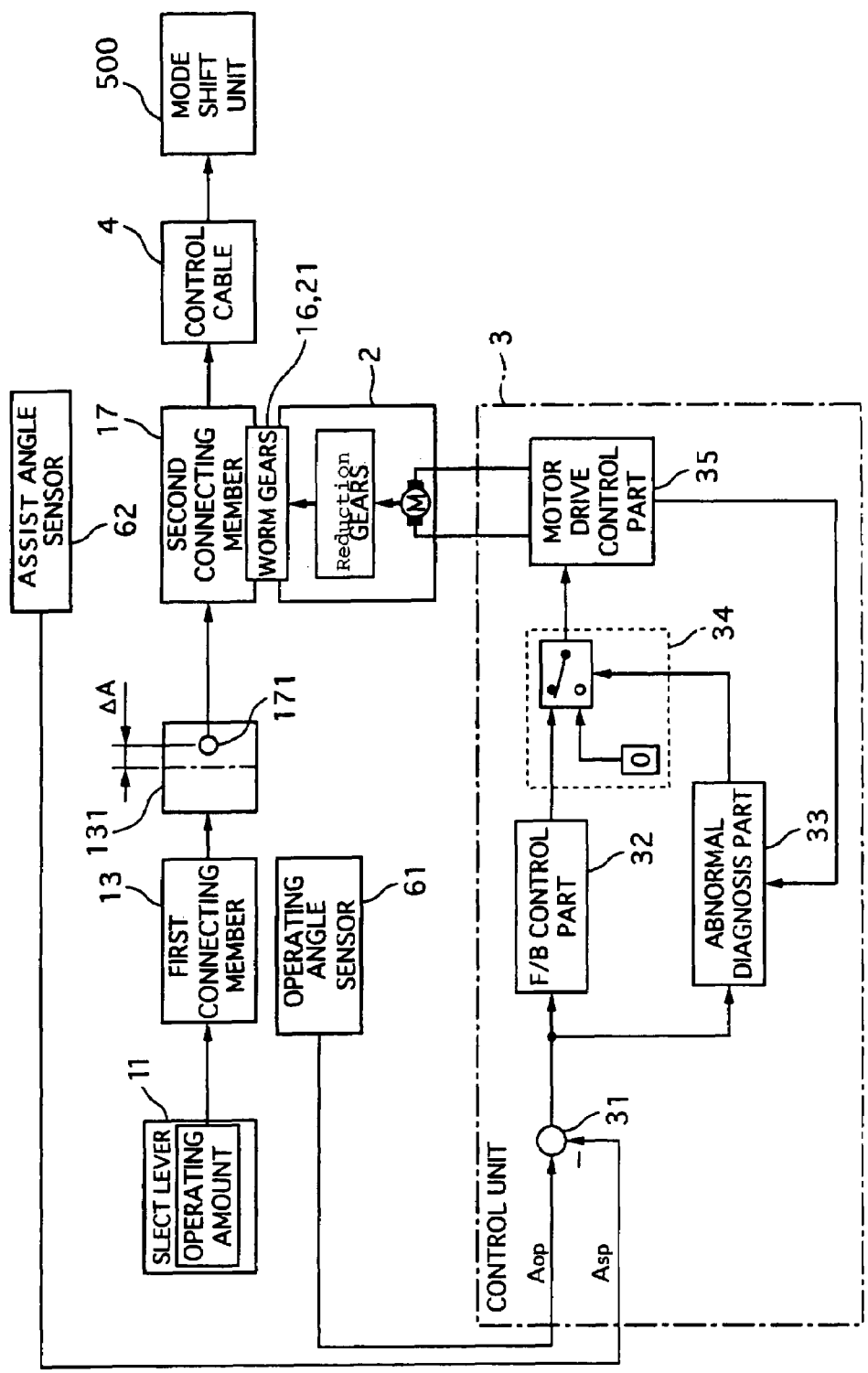
FIG. 4 is a control bock diagram of a control unit and its peripheral equipment that are used in the operating position select device shown in FIG. 1.

FIG. 4 shows a control block diagram of the control unit 3 and its related units.

The control unit 3 includes an adder 31, a feedback (F/B) control part 32, an abnormal diagnosis part 33, a drive prohibiting part 34, and a motor drive control part 35.

The adder 31 is electrically connected to the operating angle sensor 61 and the assist angle sensor 62 to receive an operating angle signal and an assist angle signal, and subtracts the assist angle signal from the operating angle signal to obtain the relative angle, then outputting a relative angle signal.

The feedback control part 32 is electrically connected to the adder 31 to receive the relative angle signal and calculates a drive command value based on the relative angle signal, then outputting a drive command value signal. The drive command value is set to lessen the detected relative angle. The feedback control part 32 acts as a drive command value calculating means of the present invention.

The abnormal diagnosis part 33 is electrically connected to the adder 31 and the motor drive control part 35 to receive the relative angle signal and a motor drive command signal, and judges abnormality of the operating angle sensor 61 and the assist angle sensor 62, outputting an abnormal diagnosis signal. The abnormality is recognized, if the relative angle indicates that the wall portion 13a or 13b and the projection 171 are in contact with each other for longer than a predetermined period in a stop state of the electric motor 2.

The drive prohibiting part 34 is electrically connected to the feedback control part 32 and the abnormal diagnosis part 33 to receive the drive command value signal and the abnormal diagnosis signal, and shifts its output signal based on the abnormal diagnosis signal. If the abnormal diagnosis signal indicates no abnormality, the output signal is set to be the drive command value signal outputted from the feedback control part 32, thereby permitting drive of the motor 2, while, if the signal indicates abnormality, the output signal is set to be zero, thereby prohibiting the drive of the motor 2. The drive prohibiting part 34 acts as a drive prohibiting means of the present invention.

The motor drive control part 35 is electrically connected to the drive prohibiting part 34 to receive the output signal therefrom. When the control part 35 receives the drive command value signal as the output signal, it outputs a motor drive current determined based on the drive command value signal to drive the motor 2. On the other hand, when the control part 35 receives a zero signal as the output signal, it outputs no electric current, thus stopping the motor 2.

An operation of the operating position select device 1 will be described.

In the select device 1, when the select lever 11 is shifted by a driver, it moves together with the first connecting member 13 and thereby changes its operating angle. According to this movement of the first connecting member 13, the wall portions 13a and 13b move relative to the projection 171 of the second connecting member 17, changing clearances between the wall portion 13a and the projection 171 and between the wall portion 13b and the projection 171. However, they do not contact with each other when the driver moves the lever 11 at normal select operation speed and his or her motor vehicle is on a substantially flat road, since the second connecting member 17 is driven by assist force of the motor 2 so as to follow the first connecting member 13.

Figure 5:
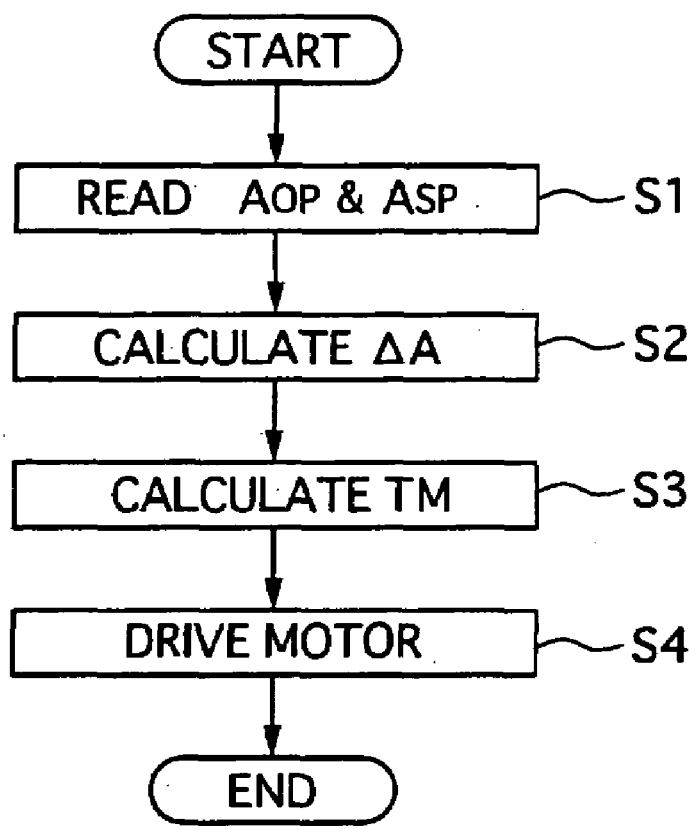
FIG. 5 is a flowchart of assist control process executed in the control unit shown in FIG. 4 for controlling the assist actuator during a select operation.

FIG. 5 shows a flowchart of an assist control process executed in the control unit 3 in order to control the motor 2 when the select lever 11 is operated by a driver.

At step S1, the adder 31 receives an operating angle signal and an assist angle signal from the operating angle sensor 61 and the assist angle sensor 62, respectively, and then the flow goes to step S2.

At the step S2, the adder 31 obtains a relative angle ΔA by subtracting the assist angle signal from the operating angle signal, outputting a relative angle signal, and then the flow goes to step 3. The operating angle sensor 61 and the assist sensor 62 are adjusted in advance so that their relative angle ΔA becomes to be zero and their angle signals becomes equal to a middle point angle, when the projection 171 is positioned at the middle point of the play opening 131. Instead of this, the angle signals or their difference may be adjusted after the angle signals are detected. It is important to obtain a relative displacement between the middle point of the play opening 131 and the projection 171 for controlling the motor 2.

At the step S3, the feedback control part 32 calculates a drive command value TM based on the relative angle ΔA to output a drive command value signal, and then the flow goes to step S4.

At the step S4, the motor drive control part 35 outputs a motor drive electric current determined based on the drive command value signal to the motor 2, thereby the motor 2 applying assist force to the manual plate lever 51 through the second connecting member 17 and the cable 4, and then the flow ends.

Figure 6:
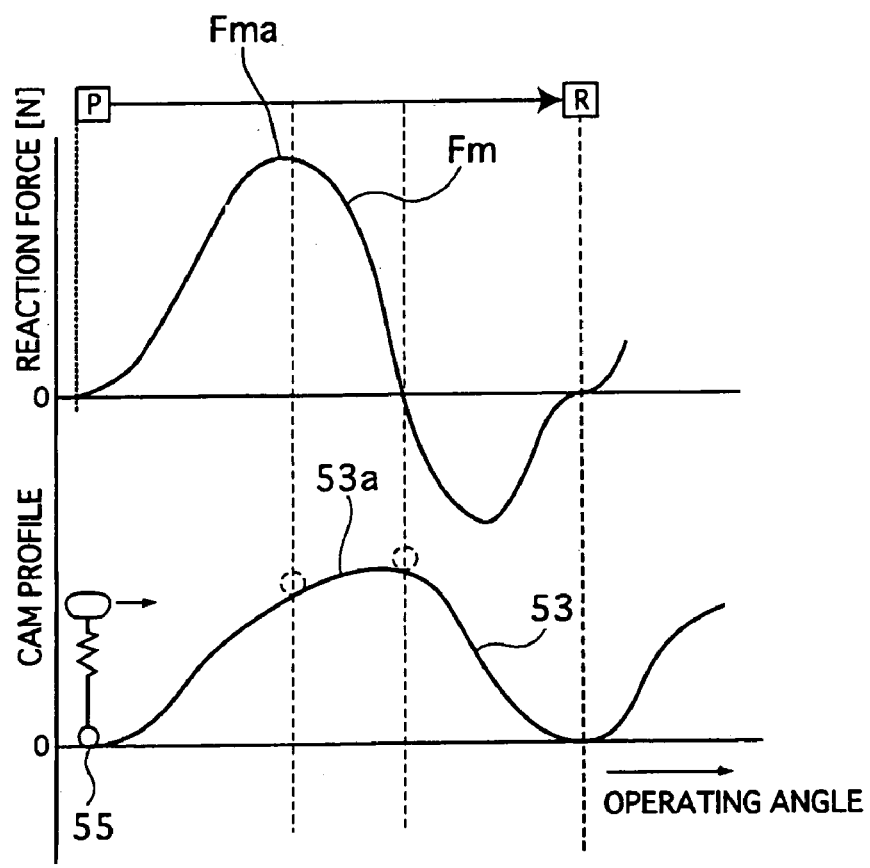
FIG. 6 is a characteristic diagram showing relationships of operating reaction force acting on a select lever and a cam profile of the detent mechanism with respect to an operating angle of the select lever, when the select lever is shifted from a P position to an R position without assist force of the assist actuator.

FIG. 6 is a basic target reaction-force table used in the assist process and shows characteristic relationships of operating reaction force Fm acting on the select lever 11, and a cam profile of the detent mechanism 510 with respect to the operating angle, respectively, during the select operation from the P position to the R position.

The operating reaction force Fm is calculated in advance by using operating select torque detected by a torque sensor in a case where the motor 15 is not driven in the select operation. The reaction force Fm is generated by resultant force from the sum of friction force caused by the cable 4, inertia force of the motor 2, spring force of the detent mechanism 510, and others.

The reaction force Fm increases in a direction opposite to the operating direction of the lever 11 as a function of the operating angle $A_{OP}$ and reaches its peak Fma before the detent pin 55 reaches the top portion 53a of the cam 530 formed on the detent plate 53, and then decreases with increasing the angle in this pullback zone.

Specifically, in the pull-back zone, the reaction force Fm acts on the lever 11 against the operating force inputted by the driver until the highest position of the cam 530, because the detent plate 53 is biased by the spring force of the spring plate 54 in a direction opposite to the operating direction. The larger the deformation amount of the spring plate 54 becomes in the pull-back zone, the further the lever 11 moves in the operating direction. Note that the operating force in the opposite direction is affected by not only the deformation amount of the spring plate 54, but also the cam profile of the cam 530. The above-described decrease of the resistance force Fm results from a slight slope of the cam 530.

In the pull-back zone, the operating force inputted from the lever 11 needs to overcome the reaction force Fm generated by the spring force of the spring plate 54 and the cam profile, in order to move the lever 11 in the operating direction.

In the highest position where the detent pin 55 is on the peak of the cam 530, the reaction force Fm acting on the lever 11 becomes zero due to its cam profile, although the spring plate 54 is deformed to the maximum degree.

After the detent pin 55 passes over the peak of the top portion 53a, the spring plate 54 starts to reduce its deformation amount until the pin 55 reaches the bottom portion 53b of the cam 530 corresponding to the R position.

In this pull-in zone, the detent plate 53 is pressed by the spring plate 54 in the operating direction, so that the lever 11 is assisted to move forward by the reaction force Fm. Accordingly, the select lever 11 is propelled by the reaction force Fm, increasing at first and then decreasing, in such a way that the lever 11 is pulled into the bottom portion 53b corresponding to the R position.

Therefore, the operating force to be applied from the lever 11 needs to be larger than and overcome the reaction force Fm shown in FIG. 6 in order to manually move the lever 11 for a select operation without assist force of the motor 2.

When the select lever 11 is not operated, it is in a stationary state where the projection 171 provided on the second connecting member 17 is located at the middle point of the play opening 131 formed on the first connecting member 13, dividing the opening 131 by the projection 171 to form a clearance at both adjacent sides of the projection 171.

In order to shift the mode shift unit 500 of the automatic transmission 5, the driver needs to operate the select lever 11. This select operation of the lever 11 causes the first connecting member 13 to be rotated therewith, because they are integrally connected with each other. At first stage of this operation, the play opening 131 moves relative to the projection 171, which in not mechanically connected with the first connecting member 13 at this stage, to change a clearance between the wall portions 13a and 13b of the opening 131 and the projection 171. In other words, a relative displacement between the first and second connecting members 13 and 17 begins to change from their stationary state.

This relative displacement during the select operation is detected by using the operating angle sensor 61 and the assist angle sensor 62, and a motor drive electric current is produced based on the relative displacement so as to drive the motor 2.

The motor 2 is supplied with the current to rotate the second connecting member 17 in the same rotating direction of the first connecting member 13 through the worm 21 and the worm wheel portion 16. Accordingly, the second connecting member 17 moves the control cable 4 to rotate the manual plate lever 51 and operate the mode shift unit 500, thereby shifting the operation modes of the automatic transmission 5.

Note that when the select lever 11 are moved at normal operating speed, the projection 171 is not in contact with the wall portions 13a and 13b of the opening 131 and therefore the second connecting member 17 can not be mechanically moved by the first connecting member 13. However, the second connecting member 17 is moved by the motor 2 based on the relative displacement between the first and second connecting members 13 and 17 to reduce their relative displacement, so that the second connecting member 17 rotates to follow the first connecting member 13. This following of the second connecting member 17 makes the manual plate lever 51 to rotate through the cable 4, thereby shifting the operation modes of the mode shift unit 500.

Figure 7:
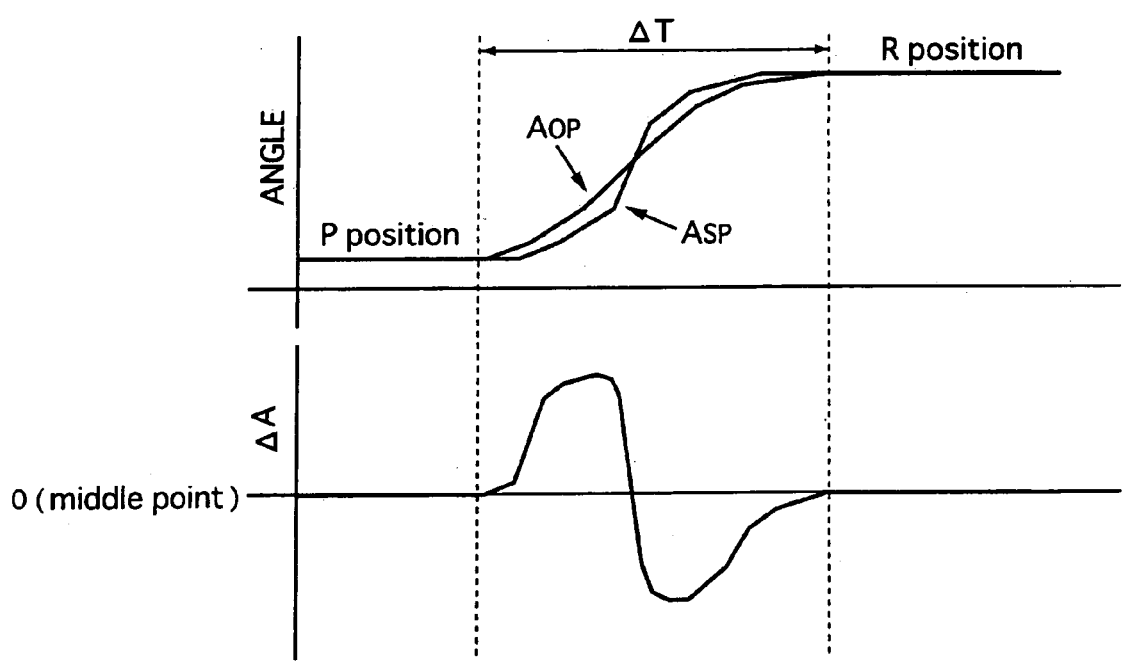
FIG. 7 is a time chart of relationships between an operating angle, an assist angle, and a variation between them when the select lever is shifted from the P position to the R position.

FIG. 7 shows a time chart of relationships between an operating angle $A_{OP}$, an assist angle $A_{SP}$, and a relative angle ΔA between them when the select lever 11 is shifted from the P position to the R position. Note that the level of the relative angle ΔA shown in the lower part of FIG. 7 is illustrated to scale up in a vertical axis direction in comparison with that shown in the upper part of FIG. 7.

As shown in the upper part of FIG. 7, the operating angle $A_{OP}$ and the assist angle $A_{SP}$ have the same angle before a select operation. During the select operation period ΔT, the operating angle $A_{OP}$ is kept to change by the driver, and the assist angle $A_{SP}$ is also kept to change by the motor 2. At first stage of the operation period ΔT, the assist angle $A_{SP}$ follows the operating angle $A_{OP}$, then the assist angle $A_{SP}$ advances than the operating angle $A_{OP}$, and they become the same angle at last. This accordance of the angles $A_{OP}$ and $A_{SP}$ is kept after the select operation as long as the select device 1 is in a normal state.

That is, at first, the first connecting member 13 advances than the second connecting member 17 due to non-contact of the wall portion 13a or 13b and the projection 171. Then, the relative displacement between them causes and is detected. The motor 2 drives and increases the assist angle $A_{SP}$ to follow and then advance than the operating angle $A_{OP}$. In other words, this motor drive moves the second rotatble member 17 to decrease the relative displacement, accordingly lessening the drive command value so as to accord their angles $A_{OP}$ and $A_{SP}$.

During the normal select operation (an operation when the lever 11 is moved at normal select speed and his or her motor vehicle is on a substantially flat road), the manual plate lever 51 is operated by the motor 2 according to a movement of the select lever 11 without mechanical contact between the projection 171 and the wall portions 13a and 13b of the opening 131, as if they were directly connected with each other through the control cable 4. Thus, this operation can be performed without impact shock due to the mechanical contact of the first and second connecting members 13 and 17, providing a smooth operating feeling to the driver.

This operating feeling, therefore, depends on checking force produced by the detent mechanism 510. A profile of the cam 530 and force of the spring plate 54 may be set so that it can provide a lightly operatable feeling for moving the select lever, even when it is shorter than the conventional one.

FIGS. 8A to 8D are schematic diagrams showing successive states of the select lever 11 and the manual plate lever 51 of the mode shift unit 500 in a select operation. The select lever 11 is mechanically linked to the first connecting member 13 and moves together with the play opening 131, while the manual plate lever 51 is mechanically linked to the projection 171 of the second connecting member 17.

Figure 8A:
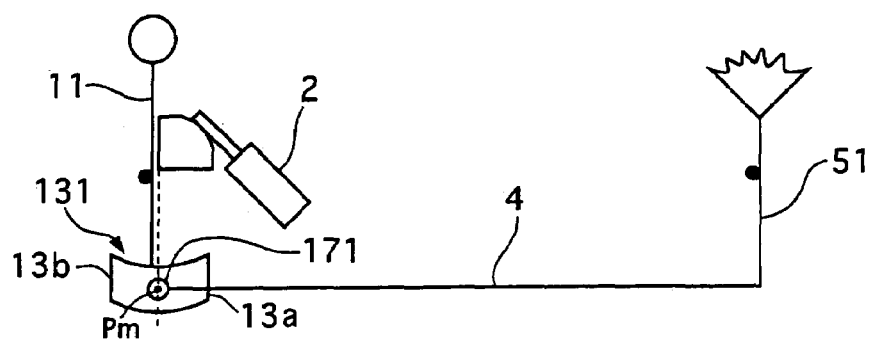
FIGS. 8A to 8D are schematic diagrams showing successive states of the select lever and a manual plate lever of the mode shift unit in a select operation.

As shown in FIG. 8A, the projection 171 is positioned at the middle point Pm of the play opening 131 and the motor 2 rests before the select operation, since their displacement is substantially zero.

Figure 8B:
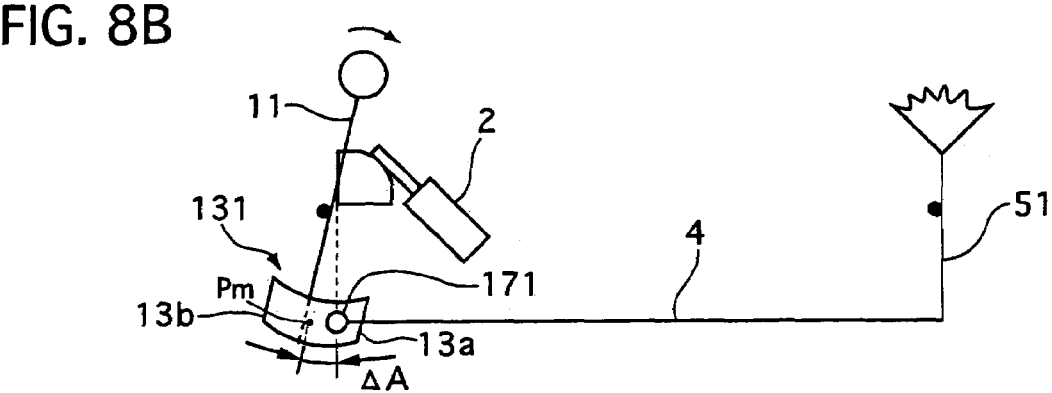

Then, as shown in FIG. 8B, the middle point Pm advances relative to the projection 171 by a relative displacement ΔA due to a movement of the select lever 11 by the select operation. This relative displacement-during the normal select operation is detected by using the sensors 61 and 62, and the motor 2 is controlled to drive the projection 171 so as to decrease the displacement, accordingly the projection 171 following the middle point Pm. In this normal select operation, the projection 171 is not in contact with the wall portion 13a or 13b of the play opening 131.

Figure 8C:
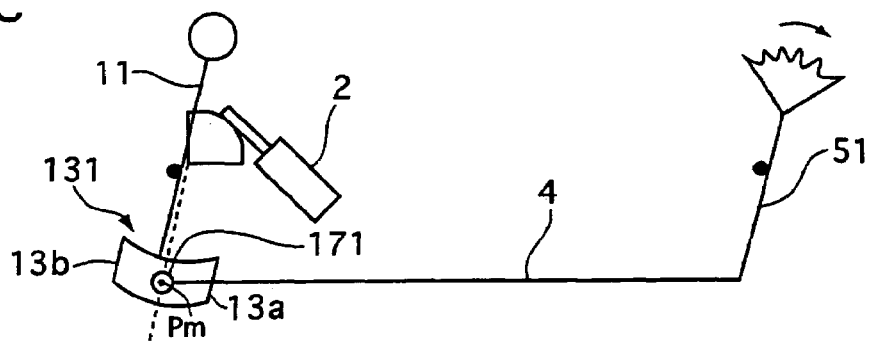

Then, as shown in FIG. 8C, the projection 172 is positioned at the middle point Pm which shifts from the middle point shown in FIG. 8A, where the motor 2 rests, since the relative displacement becomes substantial zero. This state is kept after the select operation.

On the other hand, the movement of the first and second connecting members 13 and 17 in an abnormal select operation, such as a select operation on a steep slope or at a high select-speed is different from that in the normal select operation.

First, the select operation on the steep slope will be described.

When a driver intends to start his or her motor vehicle on a steep slope and operates the select lever 11 from the P position to the D position, its operating force becomes heavier than that of a select operation on a flat road. This reason comes from increase of engaging force between the parking wheel 58 and the parking pawl 57 becomes larger due to weight of the vehicle on the slope in the P position. Consequently, the parking rod 56 connected with the detent plate 53 needs larger force to be pulled out of its parking position by the select operation. This means that large load acts on the second connecting member 17, so that the member 17 is hard to move.

Therefore, in this select operation on the steep slope, the wall portion 13a of the first connecting member 13 contacts directly with the projection 171 of the second connecting member 17, eliminating their clearance and mechanically transmitting operating force, which inputted to the lever 11 and the first connecting member 13, to the second connecting member 17. The second connecting member 17 moves the cable 4 to rotate the manual plate lever 51, and this lever 51 pulls the parking rod 56 out of its parking position through the detent plate 53.

Figure 8D:
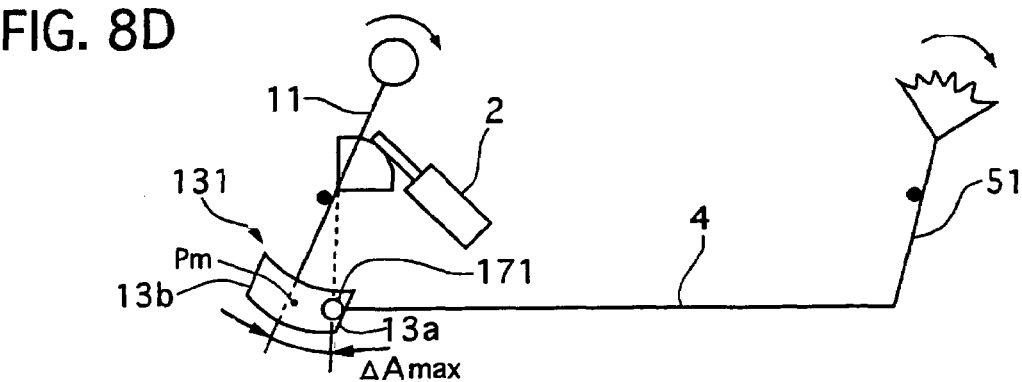

FIG. 8D shows this state, where the projection 171 moves to the maximum relative displacement ΔAmax and contacts with the wall portion 13a.

In this operation, a relative displacement between the members 13 and 17 is detected by using the sensors 61 and 62, so that the motor 2 actuates to apply its assist force to the second connecting member 17 in addition to the operating force inputted from the select lever 14 through the mechanical contact between the members 13 and 17. This motor assist force decreases the operating force of the driver to move the lever 11, accordingly producing a favorable feeling due to light operating force. Conversely, addition of the mechanical transmission of the operating force can lessen a rating of the motor 2 at that additional rate, which allows the operating position select device 1 to be reduced in size and weight.

Next, a high speed select operation will be described.

When a driver moves the select lever 11 rapidly, the motor 2 can not generate its assist force immediately. Therefore, the wall portion 13a of the first connecting member 13 contacts directly with the projection 171 of the second connecting member 17, eliminating their clearance and mechanically transmitting operating force from the select lever 11 to the second connecting member 17. This state is similar to the state shown in FIG. 8D.

The relative displacement between the members 13 and 17 is detected, so that the motor 2 actuates to apply its assist force to the second connecting member 17 in addition to the operating force inputted by the lever 14 through the mechanical contact between the members 13 and 17. The assist force is set larger than that in the normal select operation.

Then, the second connecting member 17 moves the cable 4 to rotate the manual plate lever 51 and pull the parking rod 56 out of its parking position through the detent plate 53. Therefore, in this case, the advantages can be obtained similarly to those in the select operation on the steep slope.

On the other hand, even when the motor 2, the control unit 3, the sensor 61 or 62 is electrically in trouble, the driver can shift the mode shift unit 500 by applying his or her operating force to the select lever 11. This causes mechanical contact of the wall portion 13a or 13b of the first connecting member 13 and the projection 171 of the second connecting member 17 to transmit the operating force directly to the second connecting member 17. In this case, the motor 2 can not actuate, but the mode shift unit 500 can be shiftable directly by driver's operating force, although its operating force becomes larger than that in a normal case. Therefore, the driver can surely shift the operation modes of the automatic transmission 5 even in an electrical failure of the operating position select device 1.

Incidentally, an output deviation is occasionally generated by the operating angle sensor 61 and the assist angle sensor 62 due to an error for fitting the cable 4 to the attachment portion 17a or the manual plate lever 51, elongation of the cable 4, or loose of a nut adjusting tension of the cable 4.

Apart from mechanical trouble due to the cable 4 and the others, the sensor 61 or 62 fallen in an undesirable state outputs a wrong angle signal. For example, in a case of a potentiometer type sensor having a brush movable on a conducting part of a board, its value of resistance occasionally changes due to abrasion of the brush or misalignment of the brush and the conducting portion, which brings output of wrong angle signal from the sensor 61 or 62.

The control unit 3 controls the motor 2 based on a relative angle $\Delta A$ between the operating angle $A_{OP}$ and the assist angle $A_{SP}$ even when one of them is wrong. In this case, the motor 2 moves the lever 11 to a position falling short of a desired select position or a position passing the desired select position, which causes undesirable situation, such as an improperly halted state of the lever between select positions or abnormality of the select operation by the driver.

In order to avoid such the above situation, the operating position select device 1 of the first embodiment is constructed so as to judge whether or not an output deviation of the sensors 61 and 62 is within a normal range when the motor 2 is not actuated and determine drive of the motor 2 based on its judgment.

Figure 9:
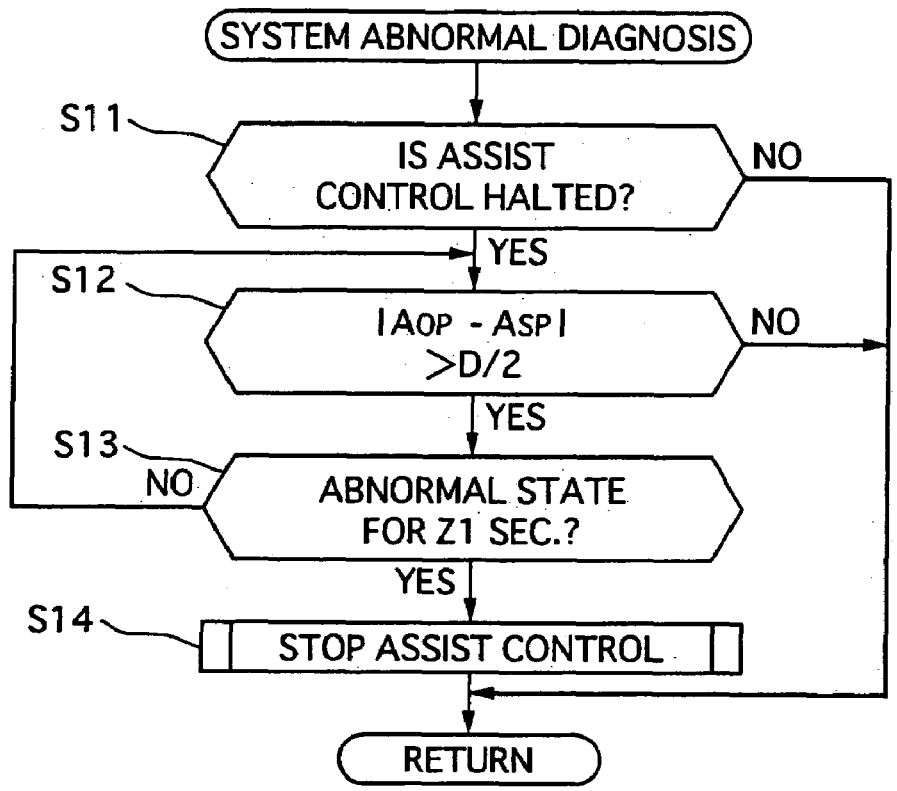
FIG. 9 is a flowchart of a system abnormal diagnosis process executed by the control unit.

FIG. 9 shows a flowchart of an abnormal diagnosis process executed by the control unit 3.

At step S11, the abnormal diagnosis part 33 judges whether or not the assist control is halted. If YES, the flow goes to step S12, while, if NO, the flow returns.

At the step S12; the part 33 judges, based on a relative displacement between an operating angle and an assist angle, whether or not a numerical value of the relative displacement is larger than a predetermined value D/2. D is a maximum possible relative angle in which the first connecting member 13 and the second connecting member 17 can move relatively to each other, and determined by a travel length of the clearances between the projection 171 and the play opening 131. If YES, abnormality of the operating position select device 1 is judged, and the flow goes to step S13, while, if NO, the device 1 is judged to be normal, and then the flow returns.

At the step S13, the part 33 judges whether or not the abnormal state of the device 1 is continued for a predetermined period Z1. The predetermined period Z1 is set to be more than a response time, approximately 30 seconds in general, from start time for operating the select lever 11 to time for permitting drive of the motor 2, allowing for a slow operation of the lever 11. This margin time for the slow operation is set to be 20 msec, which is added to the response time. Accordingly, the predetermined period Z1 is set to be 50 milliseconds (msec) for example in this embodiment. If YES, the flow goes to step S14, while, if NO, the flow goes back to the step S12.

At the step S14, the part 33 outputs an abnormal diagnosis signal to the drive prohibiting part 34. When the signal indicates the abnormal state, the prohibiting part 34 prohibits the drive command value signal from passing through it, so as to stop the motor 2. When the signal indicates the normal state, the prohibiting part 34 allows the drive command value to pass through it, so as to actuate the motor 2. And then, the flow ends.

Figure 10A:
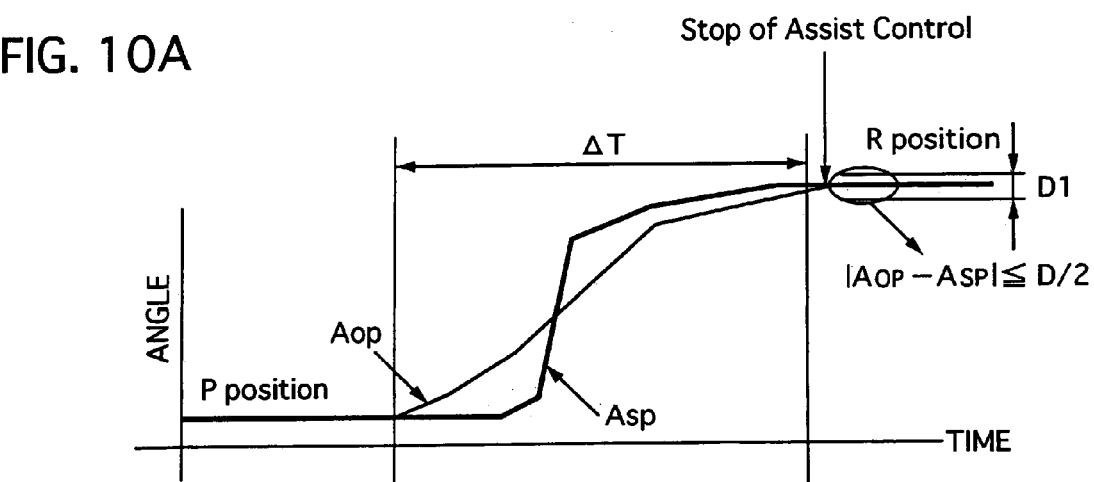
FIG. 10A and FIG. 10B are time charts each showing a state of a relationship between the operating angle and the assist angle: when the select lever is operated select from the P position to the position R.
Figure 10B:
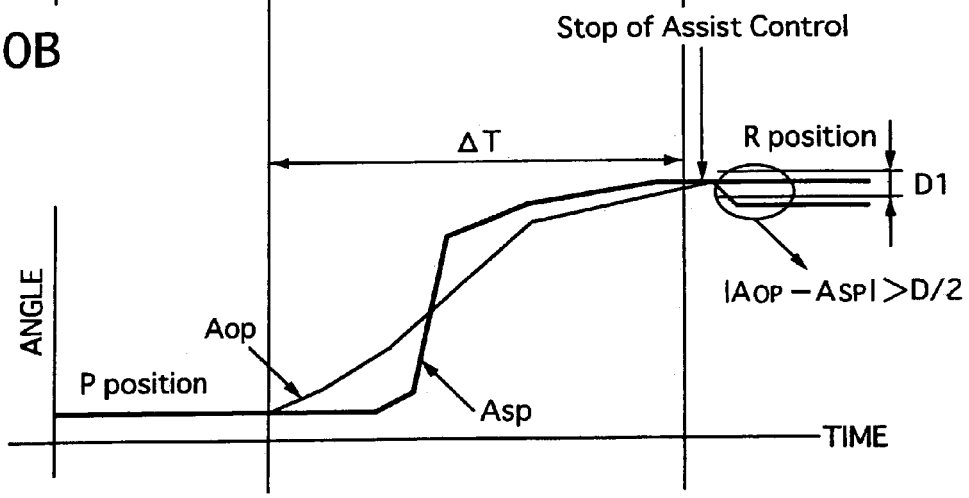

FIG. 10A and FIG. 10B show time charts of change of the operating angle $A_{OP}$ and the assist angle $A_{SP}$ when the select lever 11 is shifted from the P position to the R position, FIG. 10A and FIG. 10B showing a normal state and an abnormal state, respectively. This select operation by moving the select lever 11 from the P position to the R position is continued for an operating period $\Delta T$.

In the normal state shown in the upper half part of FIG. 10A, the drive prohibiting part 34 is shifted to directly output a drive command value signal inputted from the feedback control part 32 to the motor drive control part 35. Accordingly, the control part 35 controls the motor 2 to rotate the second connecting member 17 and follow the first connecting member 13.

After very short time from the time the select lever 11 is moved, a relative displacement $\Delta A$ is detected, and the second connecting member 17 is driven by the motor 2, catching up with the first connecting member 13. Then, when the select operation by the driver is ended, the assist control is stopped. At this time, the assist angle $A_{SP}$ becomes equal to the operating angle $A_{OP}$, which lasts from the end of the assist control to next select operation, because the operating position select device 1 is in the normal state, with no relative displacement between the operating angle $A_{OP}$ and the assist angle $A_{SP}$ when the lever 11 is positioned in the R position. This is similar to the cases when the select lever 11 is shifted from one select position to another select position whatever the select position is.

In a case where the device 1 is in an abnormal state, a relative displacement between the operating angle $A_{OP}$ and the assist angle $A_{SP}$ becomes larger tan the predetermined value D/2 and its state is continued after the assist control. When the continued relative displacement is detected, the abnormal diagnosis part 33 judges abnormality of the select device 1 and outputs an abnormal diagnosis signal to the drive prohibiting part 34. Accordingly, the prohibiting part 34 prohibits drive of the motor 2. After then, the mode shift unit 500 is operated only by the driver's operating force.

This operating position select device 1 of the first embodiment has many advantages described below.

The select lever 11 can be shorter than a conventional one by approximately 150 mm at its portion projecting from a center console toward a passenger compartment without increasing an operating force applied to the select lever 11 so much. This brings a design freedom concerning an installation location of the select lever and/or a layout of a passenger compartment to be broadened.

When operating the select lever 11, assist force from the electric motor 2 is applied to the second connecting member 17 connected with the control cable 4 and the manual plate lever 51, which can reduce the operating force applied to the select lever 11. In the normal select operation, at normal select-speed and on a substantially flat road, the first and second connecting members 13 and 17 does not contact with each other, and the second connecting member 17 is driven to follow the first connecting member 13, which enables a driver to move the select lever 11 with a light force and have a comfortable operating feeling. On the other hand, in a different select operation, such as at high select-speed or on a steep slope, the wall portion 13a or 13b and the projection 171 contact with each other to directly transmit the operating force from the select lever 11 to the mode shift unit 500 in addition to assist force outputted from the motor 2. This enables the motor 2 to be in a small size.

This select device 1 has high robust, because the projection 171 can easily move relative to the wall portions 13a and 13b of the play opening 131 when setting errors, manufacturing errors or age change occurs.

When the operating position select device 1 fails electrically, a driver can shift the mode shift unit 500 by operating the select lever 11, because the wall portion 13a or 13b and the projection 171 contact with each other, and thereby the select lever 11 and the mode shift unit 500 are mechanically connected to transmit the operating force from the select lever 11 to the mode shift unit 500. However, when this abnormality is detected by the abnormal diagnosis part 33, the drive prohibiting part, 34 prohibits drive of the motor 2. As understood by a description above, the mode shift unit 500 can be driven to shift the modes of the automatic transmission 5 by the driver's operating force, although its operating force becomes larger than that in a normal state.

Next, an operating position select device of a second embodiment according to the present invention will be described with reference to the accompanying drawings of FIGS. 11 and 12.

Figure 11:
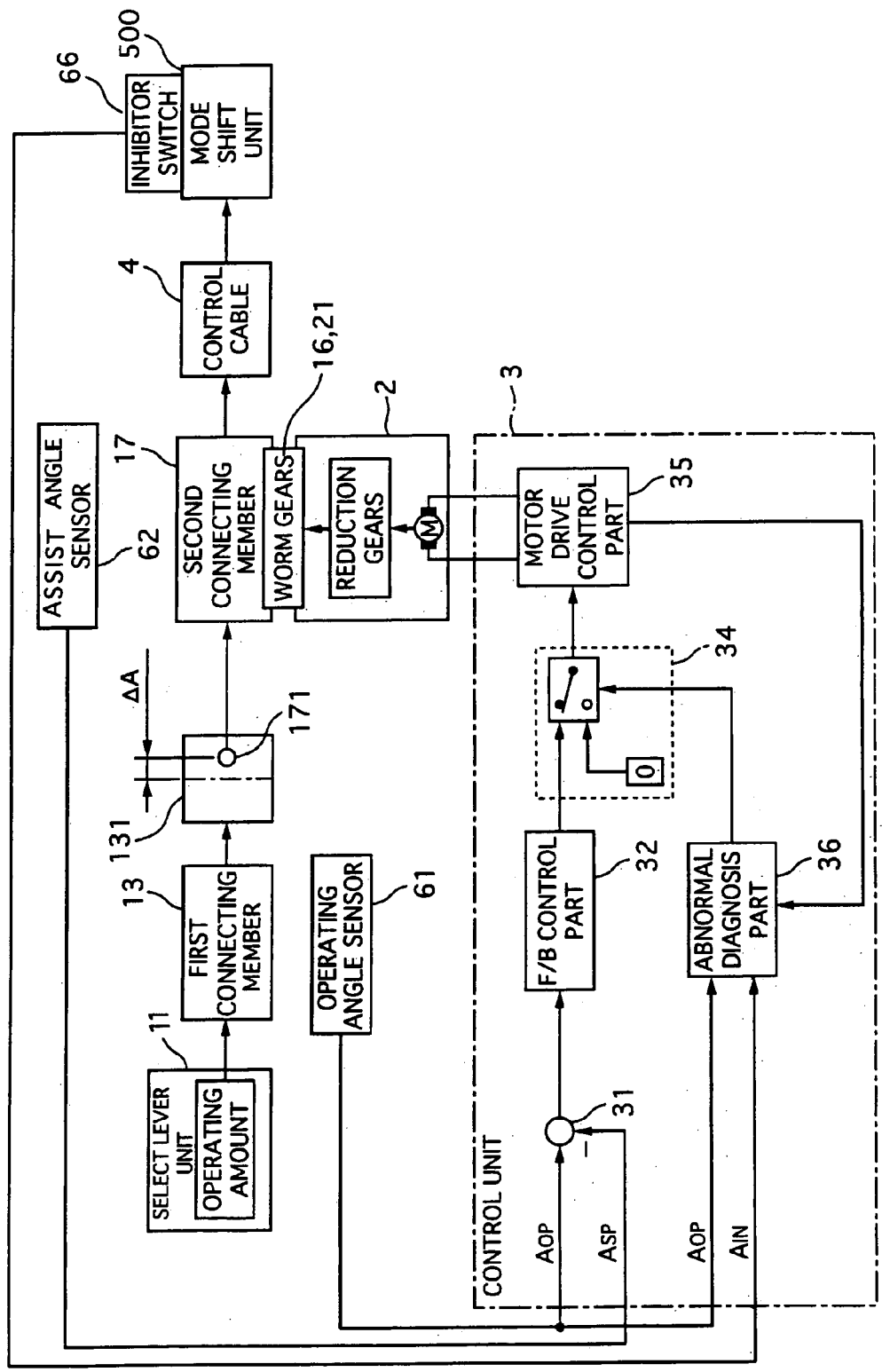
FIG. 11 is a control bock diagram of a control unit and its peripheral equipment that are used in an operating position select device of a second embodiment according to the present invention.

Referring to FIG. 11, this operating position select device is constructed similarly to that of the first embodiment shown in FIGS. 1 to 4 except a partial modification of an abnormal diagnosis part 36 in a control unit 3 and use of an inhibitor switch 66. The inhibitor switch 66 is mounted on an automatic transmission to detect a selected position $A_{IN}$ of a mode shift unit 500, and outputs a selected position signal. In this embodiment, the selected position $A_{IN}$ is a selected position angle detected by the inhibitor switch 66 so as to fit its physical quantity to an operating angle $A_{OP}$ of a select lever 11. The inhibitor switch 66 acts as a select position sensor of the present invention.

The abnormal diagnosis part 36 is electrically connected to the inhibitor switch 66 and an operating angle sensor 61 to receive the selected position $A_{IN}$ and the operating angle $A_{OP}$, and outputs an abnormal diagnosis signal. The abnormal diagnosis part 36 judges abnormality of an operating position select device based on a difference between an operating angle $A_{OP}$ and the selected position $A_{IN}$ during rest of an electric motor 2.

The other parts of the operating position select device of the second embodiment are similar to those of the first embodiment.

Figure 12:
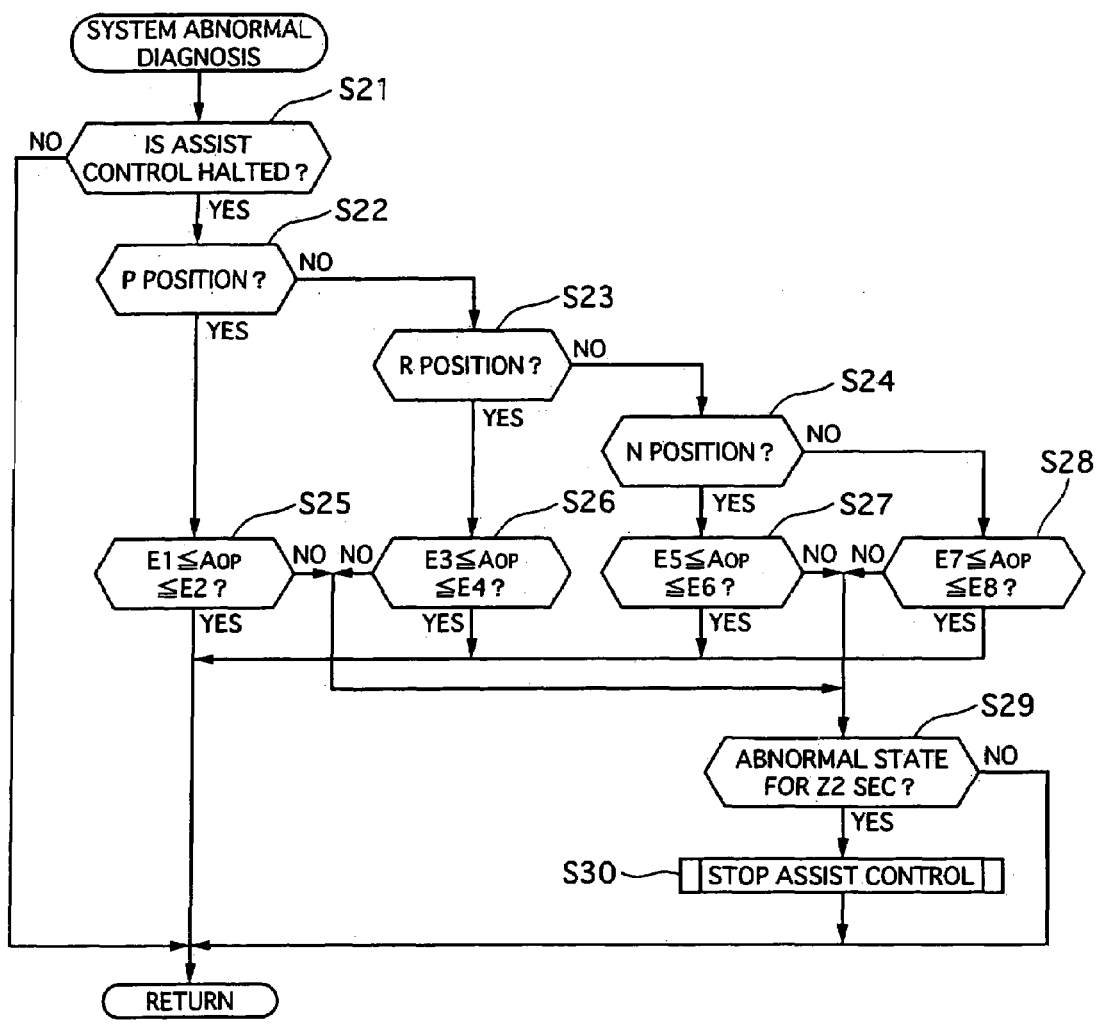
FIG. 12 is a flowchart of a system abnormal diagnosis process executed in the control unit shown in FIG. 11.

FIG. 12 is a flowchart of assist control process executed by the control unit 3 in order to control the motor 2 when the select lever 11 is operated by a driver.

In this flowchart, only three select positions, a P position, an R position, and an N position will be taken up and described for ease of explanation.

At step S21, the abnormal diagnosis part 36 receives a motor drive signal from a motor drive control part 35 and judges based on it whether or not the motor 2 is actuated. If YES, the flow goes to step S22, while, if NO, it returns.

At the step S22, the part 36 receives a selected position signal from the inhibitor switch 66 and judges based on it whether or not the automatic transmission is shifted to the P position. If YES, the flow goes to step S25, while, if NO, it goes to step S23.

At the step S23, the part 36 judges based on the selected position signal whether or not the automatic transmission is shifted to the R position. If YES, the flow goes to step S26, while, if NO, it goes to step S24.

At the step S24, the part 36 judges based on the selected position signal whether or not the automatic transmission is shifted to the N position. If YES, the flow goes to step S27, while, if NO, it goes to step S28.

At the step S25, the part 36 receives an operating angle signal from the operating angle sensor 61 and judges based on it whether or not an operating angle $A_{OP}$ is within a range between predetermined values E1 and E2. A range between the predetermined values E1 and E2 is a permissible range of the present invention. If YES, the flow returns, while, if NO, it goes to step S29.

At the step S26, the part 36 judges whether or not the operating angle $A_{OP}$ is within a range between predetermined values E3 and E4. A range between the predetermined values E3 and E4 is a permissible range of the present invention. If YES, the flow returns, while, if NO, it goes to step S29.

At the step S27, the part 36 judges whether or not the operating angle $A_{OP}$ is within a range between predetermined values E5 and E6. A range between the predetermined values E5 and E6 is a permissible range of the present invention. If YES, the flow returns, while, if NO, it goes to step S29.

At the step S28, the part 36 judges whether or not the operating angle $A_{OP}$ is within a range between predetermined values E7 and E8. A range between the predetermined values E7 and E8 is a permissible range of the present invention. If YES, the flow returns, while, if NO, it goes to step S29.

Incidentally, the predetermined values E1 to E8 are set in advance by experiment or computation based on a limit operating angle, which determines the limit angle obtained when the select lever 11 is positioned without problems and errors of the operating angle signal causes no problem after a select operation. This limit angle depends on profile of a check mechanism of an select lever unit, a check pin, and others.

At the step S29, the part 36 judges whether or not an abnormal state continues for a predetermined period Z2. If YES, the flow goes to step S30, while, if NO, it returns. The predetermined period Z2 is set to be any one of 30 seconds to 2 minutes for example in this embodiment.

At the step S30, the drive prohibiting part 34 receives an abnormal diagnosis signal, indicating abnormality, from the abnormal diagnosis part 36 and prohibits transmittance of a drive command value signal outputted from a feedback control part 32 to the motor drive control part 35. Therefore, assist control is stopped.

As described above, in the second embodiment, when the difference between the selected position $A_{IN}$ and the operating angle $A_{OP}$ is not within the predetermined range, the part 36 determines that the operating position select device has abnormality. In this case, there is a possibility that the manual plate lever is not shifted to a target select position, although the motor 2 drives the manual plate lever toward the target select position. This may cause an improper halt of the select lever 11 between the select portions or wrong operation of the driver, and therefore drive of the motor 2 is stopped.

The operating position select device of the second embodiment has the following advantages in addition to those of the first embodiment explained above.

This device can prevent the improper halt of the select lever 11 and the wrong operation of the driver by using the abnormal diagnosis. This abnormal diagnosis is executed by using the selected position $A_{IN}$ of the inhibitor switch 66, which comes from the results of the assist control using the motor 2 according to an operation of the select lever 11. Accordingly, this diagnosis can provide an accurate judgment of the abnormality of the operating position select device, since the purpose of the assist control is to adjust control results to the target select position.

Further, the selected position is detected by the inhibitor switch 66, used in the conventional automatic transmissions, which enables a manufacturing cost of the device to be suppressed.

Next, an operating position select device of a third embodiment according to the present invention will be described with reference to the accompanying drawings of FIGS. 13 and 14.

Figure 13:
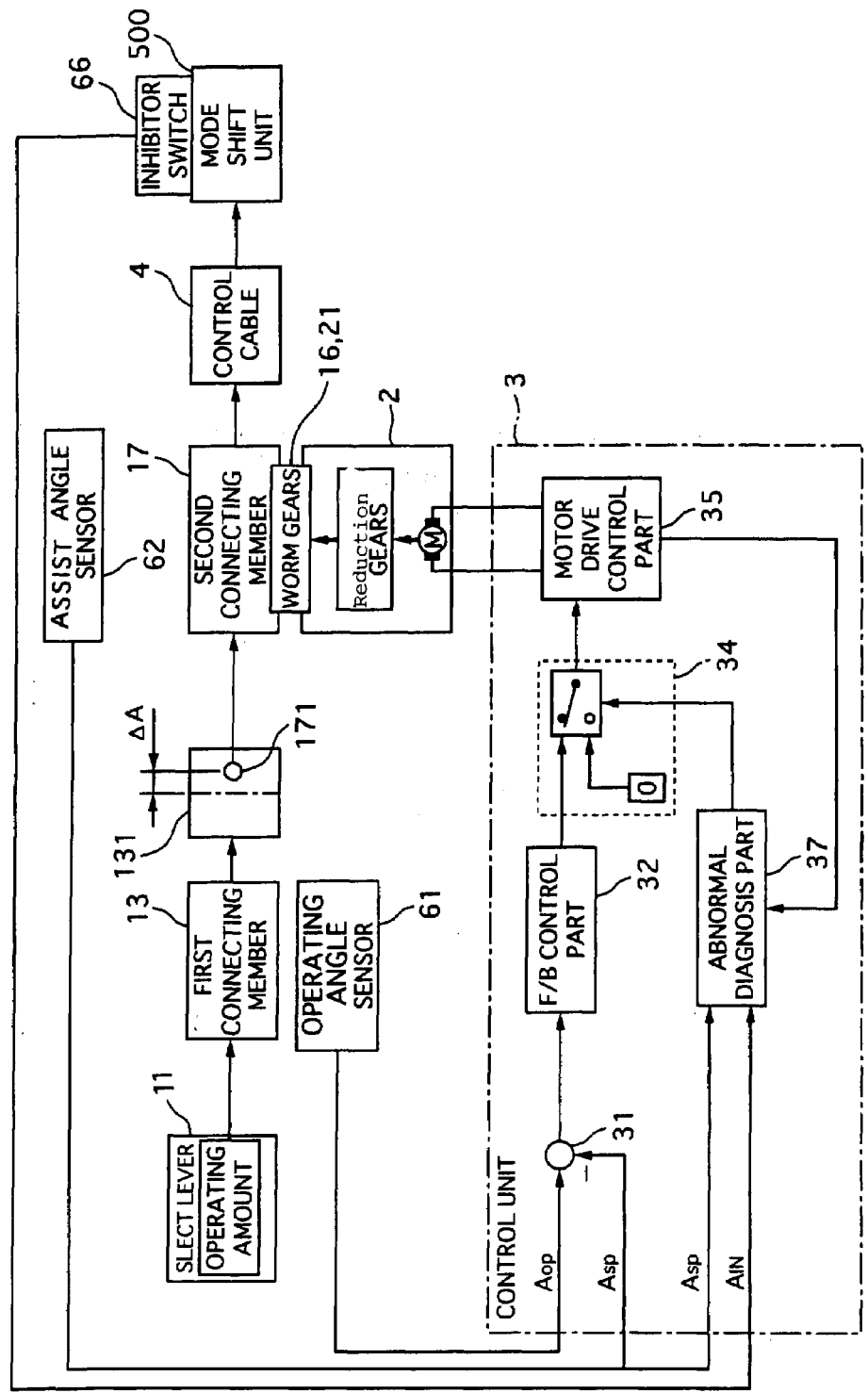
FIG. 13 is a control bock diagram of a control unit and its peripheral equipment that are used in an operating position select device of a third embodiment according to the present invention.

Referring to FIG. 13, this operating position select device is constructed similarly to that of the first embodiment shown in FIGS. 1 to 4 except a partial modification of an abnormal diagnosis part 37 in a control unit 3 and use of an inhibitor switch 66. The inhibitor switch 66 is mounted on an automatic transmission to detect a selected position $A_{IN}$ of a mode shift unit 500, corresponding to the assist angle in the first embodiment, and outputs a selected position signal. In this embodiment, the selected position $A_{IN}$ is a selected position angle detected by the inhibitor switch 66 so as to fit-its physical quantity to an assist angle $A_{SP}$ of the mode shift unit 5. The inhibitor switch 66 acts as a select position sensor of the present invention.

The abnormal diagnosis part 37 is electrically connected to the inhibitor switch 66 and an assist angle sensor 62 to receive the selected position $A_{IN}$ and the assist angle $A_{SP}$, and outputs an abnormal diagnosis signal. The abnormal diagnosis part 37 judges abnormality of the operating position select device based on a difference between an assist angle $A_{OP}$ and an selected position $A_{IN}$ during rest of an electric motor 2.

The other parts of the operating position select device of the third embodiment are similar to those of the first embodiment.

Figure 14:
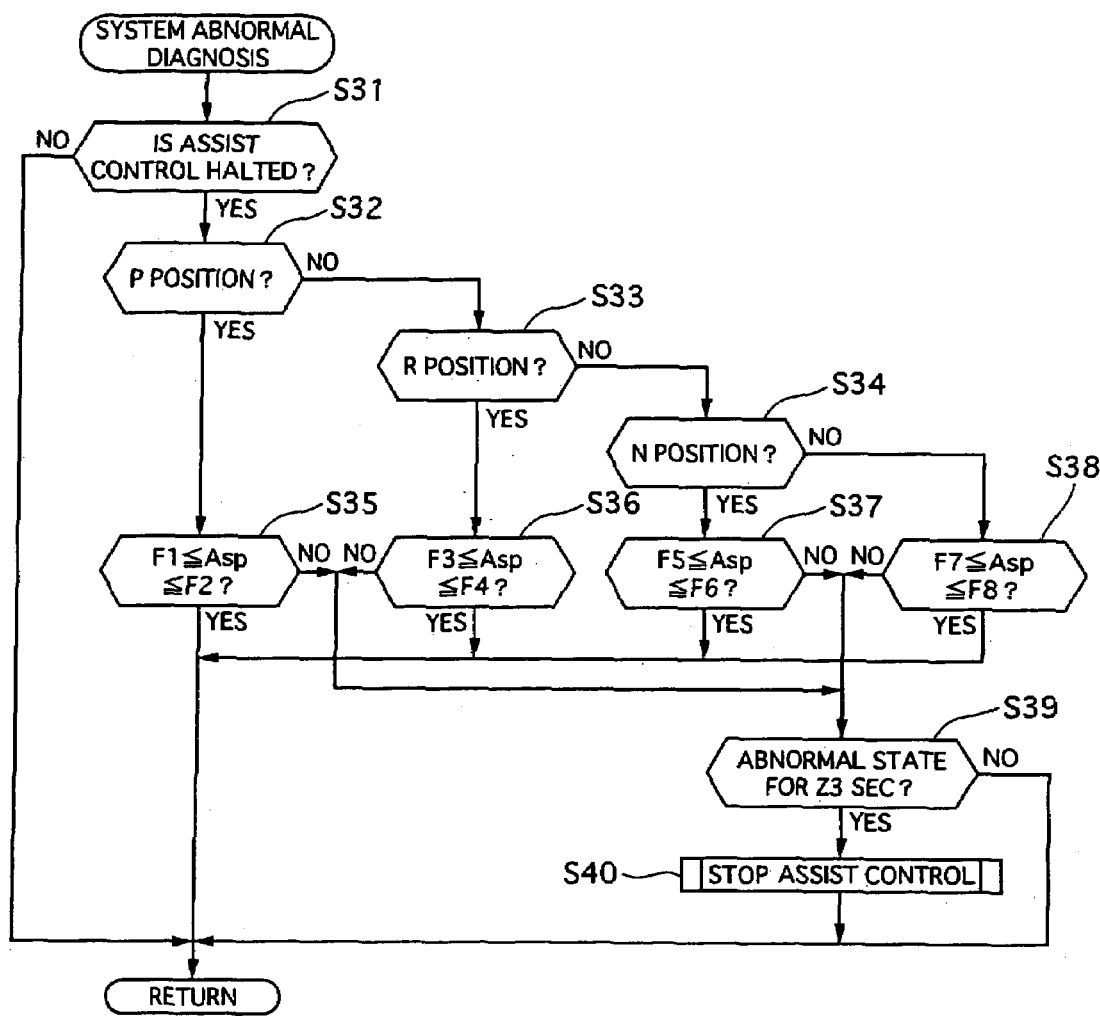
FIG. 14 is a flowchart of a system-abnormal diagnosis process executed in the control unit shown in FIG. 13.

FIG. 14 is a flowchart of assist control process executed by the control unit 3 in order to control the motor 2 when a select lever 11 is operated by a driver.

In this flowchart, only three select positions, a P position, an R position, and an N position will be taken up and described for ease of explanation.

At step S31, the abnormal diagnosis part 37 receives a motor drive signal from a motor drive control part 35 and judges based on it whether or not the motor 2 is actuated. If YES, the flow goes to step S32, while, if NO, it returns.

At the step. S32, the part 37 receives a selected position signal from the inhibitor switch 66 and judges based on it whether or not the automatic transmission is shifted to the P position. If YES, the flow goes to step S35, while, if NO, it goes to step S33.

At the step S33, the part 37 judges based on the selected position signal whether or not the automatic transmission is shifted to the R position. If YES, the flow goes to step S36, while, if NO, it goes to step S34.

At the step S34, the part 37 judges based on the selected position signal whether or not the automatic transmission is shifted to the N position. If YES, the flow goes to step S37, while, if NO, it goes to step S38.

At the step S35, the part 37 receives an assist angle signal from the assist angle sensor 62 and judges based on it whether or not an assist angle $A_{SP}$ is within a range between predetermined values F1 and F2. A range between the predetermined values F1 and F2 is a permissible range of the present invention. If YES, the flow returns, while, if NO, it goes to step S39.

At the step S36, the part 37 judges whether or not the assist angle $A_{OP}$ is within a range between values F3 and F4. A range between the predetermined values F3 and F4 is a permissible range of the present invention. If YES, the flow returns, while, if NO, it goes to step S39.

At the step S37, the part 37 judges whether or not the operating angle $A_{OP}$ is within a range between values F5 and F6. A range between the predetermined values F5 and F6 is a permissible range of the present invention. If YES, the flow returns, while, if NO, it goes to step S39.

At the step S38, the part 37 judges whether or not the operating angle $A_{OP}$ is within a range between values F7 and F8. A range between the predetermined values F7 and F8 is a permissible range of the present invention. If YES, the flow returns, while, if NO, it goes to step S39.

Incidentally, the predetermined values F1 to F8 are set in advance by experiment or computation based on a limit operating angle, which determines the limit angle obtained when the select lever 11 is positioned without problems and errors of the operating angle signal causes no problem after a select operation. This limit angle depends on profile of a check mechanism of an select lever unit, a check pin, and others.

At the step S39, the part 37 judges whether or not an abnormal state continues for the predetermined period Z3. If YES, the flow goes to step S40, while, if NO, it returns. The predetermined period Z3 is set to be any one of 30 seconds to 2 minutes for example in this embodiment.

At the step S40, the drive prohibiting part 34 receives an abnormal diagnosis signal, indicating the abnormality of the device, from the abnormal diagnosis part 37 and prohibits transmittance of a drive command value signal outputted from a feedback control part 32 to the motor drive control part 35. Therefore, assist control is stopped.

As described above, in the third embodiment, when the difference between the selected position. $A_{IN}$ and the assist angle $A_{SP}$ is not within the permissible range, the part 37 determines that the operating position select device has abnormality. In this case, there is a possibility that the manual plate lever is not shifted to a target select position, although the motor 2 drives the manual plate lever toward the target select position. This may cause an improper halt of the select lever 11 between the select portions or wrong operation of the driver, and therefore drive of the motor 2 is stopped.

The operating position select device of the third embodiment has the following advantages in addition to those of the first embodiment explained above.

This device can prevent the improper halt of the select lever 11 and the wrong operation of the driver by using the abnormal diagnosis. This diagnosis is executed based on the selected position $A_{IN}$ of the inhibitor switch 66, which comes from the results of the assist control using the motor 2 according to an operation of the select lever 11. Accordingly, this diagnosis can provide an accurate judgment, since the purpose of the assist control is to adjust the control results to the target select position.

Further, the selected position is detected by the inhibitor switch 66, used in the conventional automatic transmissions, which enables a manufacturing cost of the device to be suppressed.

Next, an operating position select device of an fourth embodiment according to the present invention will be described with reference to the accompanying drawings of FIGS. 15 to 17.

Figure 15:
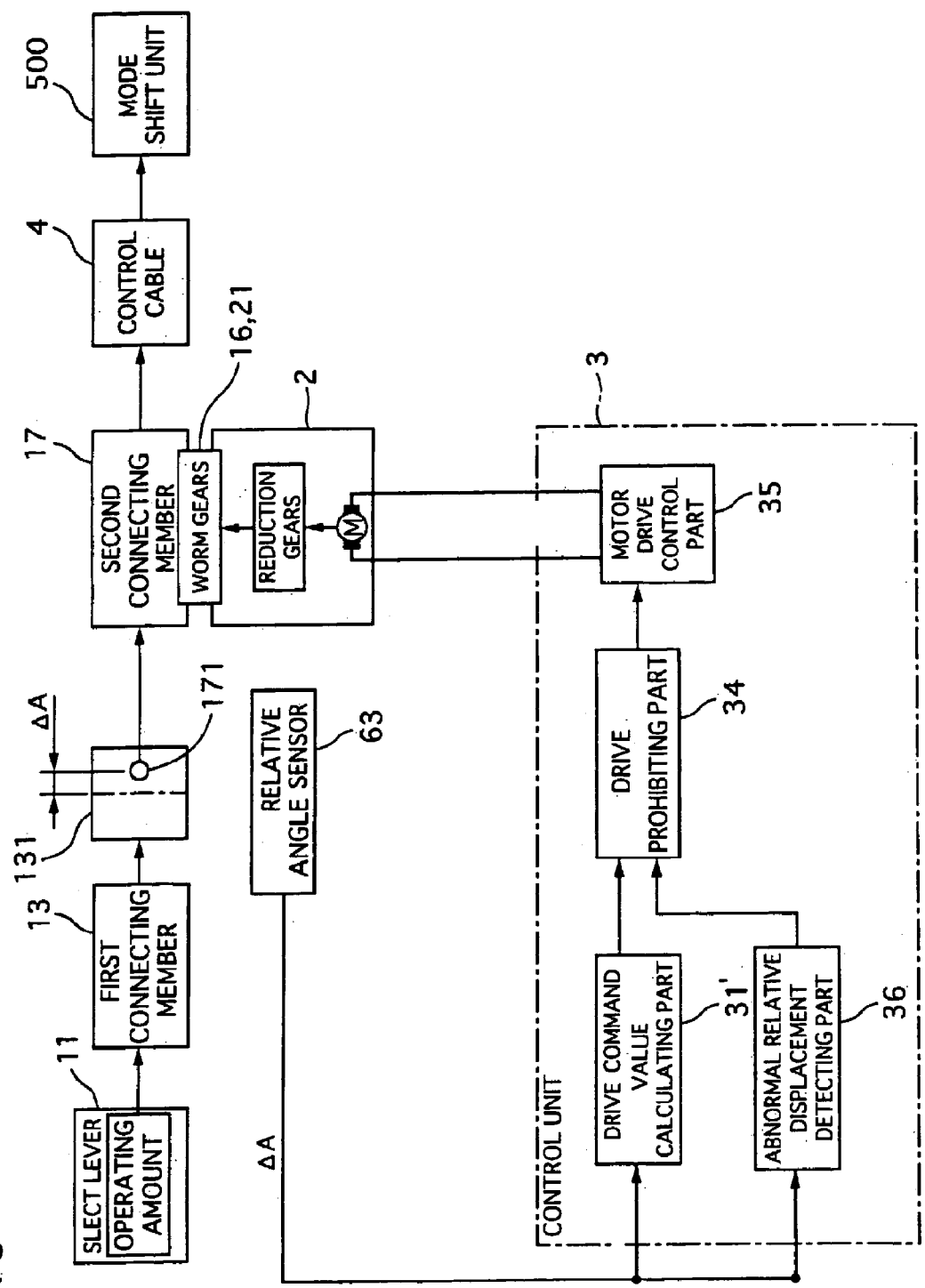
FIG. 15 is a control bock diagram of a control unit and its peripheral equipment that are used in an operating position select device of a fourth embodiment according to the present invention.
Figure 16:
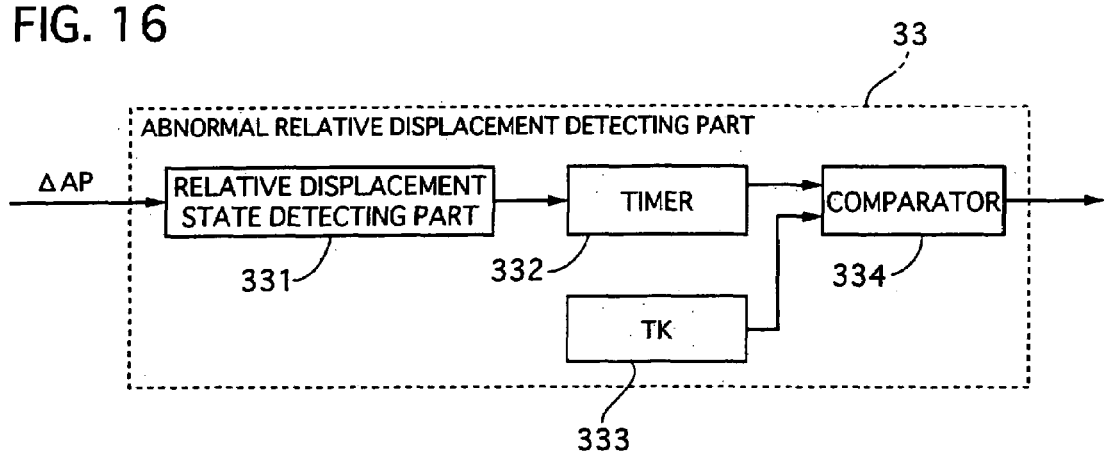
FIG. 16 is a control bock diagram of an abnormal relative displacement detecting part which is a part of the control unit shown in FIG. 15.

Referring to FIG. 15, this operating position select device is constructed similarly to that of the first embodiment shown in FIGS. 1 to 4 except a partial modification of a control unit 3 and use of a relative angle sensor 63 instead of the operating angle sensor and the assist angle sensor.

The relative angle sensor 63 is arranged at or near a supporting shaft rotatably supporting a first connecting member and a second connecting member to detect a relative angle $\Delta A$ between these members.

This sensor 63 is constructed as follows. For example, on a surface of the first connecting member, an electric terminal is fixed, and on its facing face of the second connecting member, a carbon resistor printed on a substrate is fixed. The electric terminal is movable around the supporting shaft together with the first connecting member to change its angle with respect to the carbon resistor of the second rotatble member. This angle change causes a change of resistance value, and consequently electric current flowing them changes. This current is used as a relative angle signal. The electric terminal and the carbon resister may be replaced with each other. The relative angle sensor 63 acts as a relative displacement sensor of the present invention, and the relative angle $\Delta A$ corresponds a relative displacement of the present invention.

The control unit 3 includes a drive command value calculating part 31', a drive prohibiting part 34, a motor drive control part 35, and an abnormal relative displacement detecting part 36.

The drive command value calculating part 31' is electrically connected to the relative angle sensors 63 to receive a relative angle $\Delta A$, and calculates a drive command value based on it, outputting a drive command value signal. The drive command value calculating part 31' acts as a drive command value calculating means of the present invention.

The abnormal relative displacement detecting part 36 is electrically connected to the relative angle sensors 63 to receive the relative angle $\Delta A$, and judges abnormality of the select device, outputting an abnormal state judgment signal. For this purpose, as shown in FIG. 16, the abnormal relative displacement detecting part 36 includes a relative displacement state detecting part 331, a timer 332, a memory 333, and a comparator 334.

The relative displacement state detecting part 331 is electrically connected to the relative angle sensor 63 to receive the relative angle $\Delta A$. Then, it judges a displacement state whether or not the relative angle $\Delta A$ is within a permissible range limited by a relatively movable amount between a first connecting member and a second connecting member, such as a travelable amount of an projection fixed on the second connecting member in a play opening formed in the first connecting member.

The timer 332 is electrically connected to the relative displacement state detecting part 331 and starts to count up elapsed time when it receives a signal from the state detecting part 331 indicating that the relative angle $\Delta AP$ is out of the permissible range. The timer 332 clears the elapsed time when it receives a signal indicating that the relative angle $\Delta A$ is within the permissible range.

The memory 333 stores a predetermined period as a predetermined period TK for judging abnormality of the select device. The predetermined period TK is set, for example any one of 30 seconds to 2 minutes, allowing for drive current application time to shift the select lever to an adjacent select position at the maximum current level, which is obtained in a case where the relative angle $\Delta A$ is out of the permissible range, since drive current becomes larger in proportion to the relative angle $\Delta A$.

The comparator 334 is electrically connected to the timer 332 and the memory 333 and compares the elapsed time to the predetermined period TK. When it judges that the elapsed time is within the predetermined period TK, it outputs an abnormal state judgment signal for allowing the drive command value signal to pass therethrough, while, when it judges that the elapsed time is out of the predetermined period TK, it outputs the abnormal state judgment signal for prohibiting passing-through of the signal.

The drive prohibiting part 34 is electrically connected to the calculating part 31' and the comparator 334 of the detecting part 36 to receive the drive command value signal and the abnormal state judgment signal to control an output of the drive command value signal. Specifically, when the received judgment signal indicates abnormality, the prohibiting part 34 outputs the drive command value signal, indicating drive command value of zero, to stop the motor 2, while, when the signal indicates a normal state, it outputs directly the drive command value signal inputted from the calculating part 31' to drive the motor 2. The drive prohibiting part 34 acts as a drive prohibiting means of the present invention.

The motor drive control part 35 is electrically connected to the drive prohibiting part 34 to receive the drive command value signal. When it receives the signal, it supplies the motor 2 with drive current determined based on the signal under PWM control to the motor 2.

The other parts of the operating position select device of the fourth embodiment are similar to those of the first embodiment.

The assist control is executed as follows according to a flowchart similar to that of the first embodiment shown in FIG. 5. In this embodiment, a relative angle $\Delta A$ is used instead of the operating angle and the assist angle in the first embodiment. Specifically, the drive command value calculating part 31' receives a relative angle $\Delta A$ to determine a motor command value based on the relative angle $\Delta A$. The motor drive control part 35 receives the motor command value and outputs a motor drive electric current determined based on the value to the motor 2.

Figure 17:
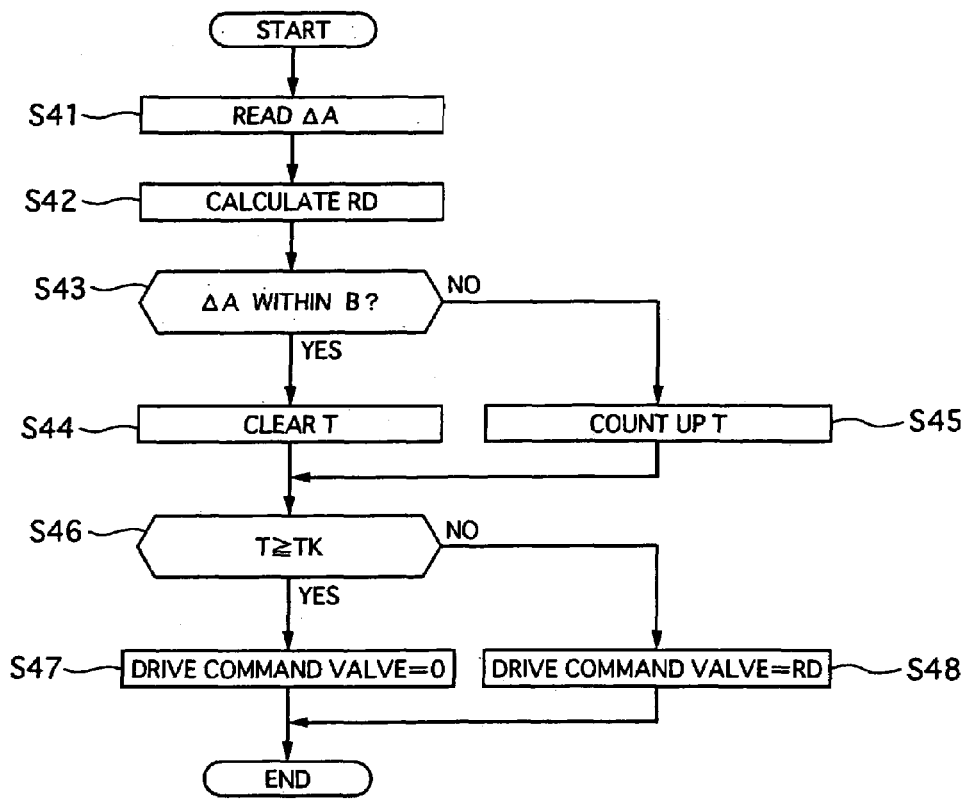
FIG. 17 is a flowchart of a system abnormal diagnosis process executed in the control unit shown in FIG. 15.

FIG. 17 is a flowchart of an abnormal diagnosis process executed in the control unit 3.

At step 41, the drive command value calculating part 31' and the abnormal relative displacement detecting part 36 read a relative angle $\Delta AP$, and then the flow goes to step S42.

At the step S42, the calculating part 31' calculates a motor command value based on the relative angle $\Delta A$, and then the flow goes to step S43. Incidentally, in this embodiment, the calculating part 31' calculates a duty ratio RD as the motor command value for controlling the motor. 2 under PWM drive by using Proportional-Integral-Derivative (PID) control.

At the step S43, the relative displacement state detecting part 331 of the detecting part 36 judges whether or not the relative angle $\Delta A$ is within a permissible range B. The permissible range B is set similarly to that of the second and third embodiments. If YES, the flow goes to step S44, while, if NO, it goes to step S45.

At the step S 44, the timer 332 clears elapsed time T, and then the flow goes to step S46.

At the step S45, the timer 332 starts to count up the elapsed time T, and then the flow goes to the step S46.

At the step S46, the comparator 334 judges whether or not the elapsed time T is equal to or larger than the predetermined period TK. If YES, the flow goes to step S47, while, if NO, it goes to step S48.

At the step S47, the drive prohibiting part 34 outputs the drive command value signal set to be zero, and then the flow ends.

At the step S48, the drive prohibiting part 34 outputs directly the drive command value signal inputted from the calculating part 31', and then the flow ends.

The abnormality may occur due to the following reasons.

The first reason is abnormality of the relative angle sensor 63, which outputs a wrong relative angle signal indicating an angle out of the permissible range, although it is actually within the permissible range. In this case, the timer 332 starts to count up an elapsed time T according to the steps S42 and S45, and when the elapsed time T is counted up to the predetermined period TK, the drive command value is set to be zero by the drive prohibiting part 34 to stop the motor 2. This brings the projection and the wall portion of the play opening to be in contact with each other, mechanically transmitting operating force inputted from the select lever 11 to the mode shift unit through a control cable, but its operating force needs to be larger to move the lever 11.

Since the predetermined period TK is set based on drive command value application time to shift to the adjacent select position when the maximum drive command value is outputted, the drive prohibiting part 34 prevents the motor 2 from being driven before a shift to the adjacent select position has completed, avoiding unintentional mode-shifting of the automatic transmission.

Another reason is an instantaneous abnormality due to noise and the like. In this case, the steps S13 and S15 are executed during its initial phase, so that the timer 332 starts to count up the elapsed time T, but when a detected relative angle ΔA returns to a normal value before the elapsed time T reaches the predetermined period TK, the flow goes to the steps S13 and S14 to clear the elapsed time T and permit drive of the motor 2.

Therefore, the drive of the motor 2 is prohibited when the noise affecting on an overrun of the select lever 11 occurs, while it is permitted when noise occurs and immediately reduces to the amount free from the overrun or when the noise does not occur.

The operating position select device of the fourth embodiment has the following advantages in addition to those of the first embodiment.

The abnormal relative displacement detecting part 36 can distinguish an instantaneous abnormality due to such as noise from not-instantaneous abnormality. Therefore, drive or stop of the motor 2 is controllable optimally according to level of affection of the abnormality detected.

Next, an operating position select device of a fifth embodiment of the present invention will be described with reference to the accompanying drawings of FIGS. 18 to 20.

Figure 18:
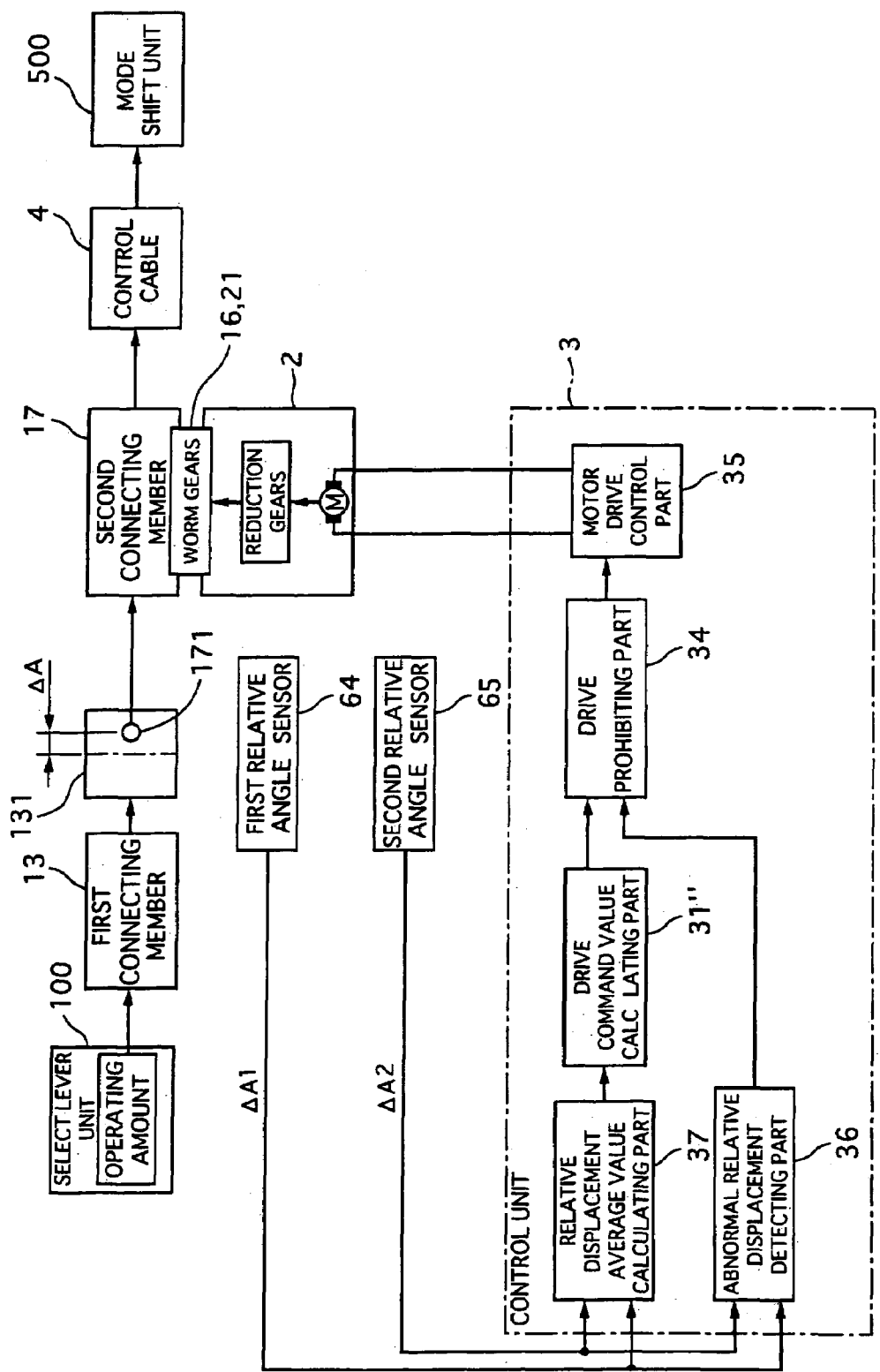
FIG. 18 is a control bock diagram of a control unit and its peripheral equipment that are used in an operating position select device of a fifth embodiment according to the present invention.
Figure 19:
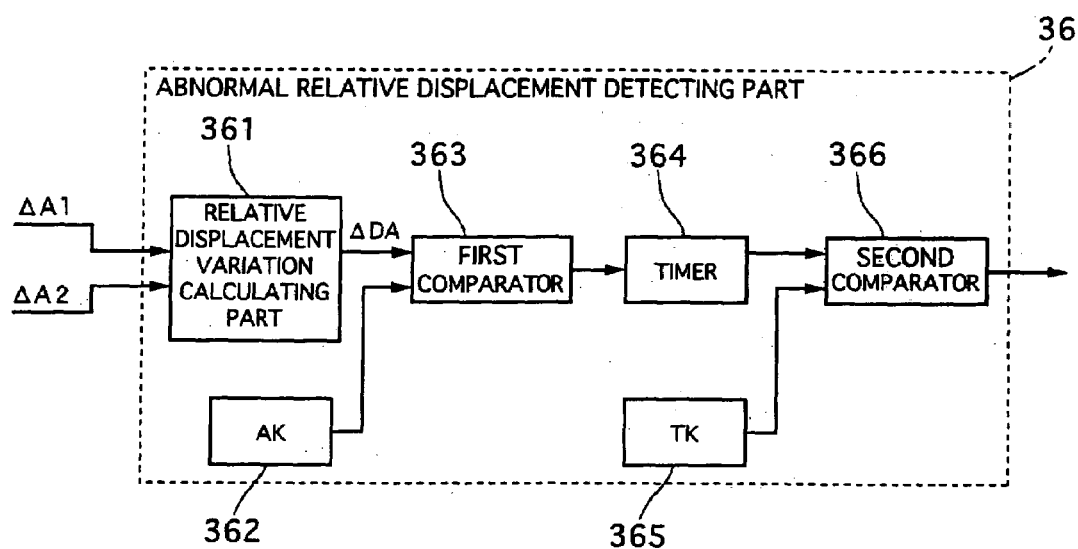
FIG. 19 is a control bock diagram of an abnormal relative displacement detecting part which is a part of the control unit shown in FIG. 18.

Referring to FIG. 18, this operating position select device is constructed similarly to that of the first embodiment shown in FIGS. 1 to 4 except a modification of a control unit 3 and use of a first relative angle sensor 64 and a second relative angle sensor 65, instead of the relative angle sensor. The control unit includes a relative displacement average value calculating part 37, a drive command value calculating part 31", an abnormal relative displacement detecting part 36, a drive prohibiting part 34, and a motor drive control part 35.

The first relative angle sensor 64 is arranged at or near a supporting shaft rotatably supporting a first connecting member and a second connecting member to detect a first relative angle ΔA1 between these members and output a first relative angle signal. This sensor 64 is constructed as follows. For example, on a surface of the first connecting member, an electric terminal is fixed, and on its facing face of the second connecting member, a carbon resistor printed on a substrate is fixed. The electric terminal is movable around the supporting shaft together with the first connecting member to change its angle with respect to the carbon resistor of the second rotatble member. This angle change causes a change of resistance value, and consequently electric current flowing them changes. This current corresponds to the first relative angle signal. The electric terminal and the carbon resister may be replaced with each other. The first relative angle sensor 64 acts as a relative position sensor of the present invention.

The second relative angle sensor 65 is also arranged at or near the supporting shaft to detect a second relative angle ΔA2 between these members and output a second relative angle signal. This sensor 65 employs, for example, the same type of the first relative angle sensor 64. The second relative angle sensor 65 acts as the relative position sensor of the present invention, and the second relative angle signal corresponds to the relative position signal of the present invention.

The first and second relative sensors 64 and 65 may use another type, for example, a rotary encorder using a light emitting element, a light-sensitive element, and a disc with slits located between them. The elements are fixed on one of the first and second connecting members, and the disc is fixed to the other of the members. The light-sensitive elements receives light emitted from the light emitting element and passing through the slits of the disc, which can provide an electric current, corresponding to the second relative angle signal. The first and second relative angle sensors 64 and 65 may use a different type from each other.

The relative displacement average value calculating part 37 is electrically connected to the first relative angle sensor 64 and the second relative angle sensor 65 to receive the first relative angle signal and the second relative angle signal to calculate a relative displacement average value of them and output a relative displacement average value signal.

The drive command value calculating part 31" is electrically connected to the average value calculating part 37 to receive the relative displacement average value signal and calculate a drive command value, outputting a drive command value signal. The drive command value calculating 31" acts as a drive command value calculating means of the present invention.

The abnormal relative displacement detecting part 36 is electrically connected to the first relative angle sensor 64 and the second relative angle sensor 65 to receive the first relative angle signal and the second relative angle signal, and judges abnormality of the select device, outputting an abnormal state judgment signal. For this purpose, as shown in FIG. 19, the detecting part 36 has a relative displacement variation calculating part 361, a first memory 362, a first comparator 363, a timer 364, a second memory 365, and a second comparator 366.

The relative displacement variation calculating part 361 is electrically connected to the first relative angle sensor 64 and the second relative angle sensor 65 to receive the first relative angle signal and the second relative angle signal, and calculates a variation ΔDA between the first and second relative angles ΔA1 and ΔA2, outputting a variation signal.

The first memory 362 stores a limit value AK of a permissible range, which is an allowable value of a variation between the first and second relative angles.

The first comparator 363 is electrically connected to the calculating part 361 and the first memory 362 to receive the variation signal and the limit value AK. The compressor 363 compares them to output a timer start signal so that it may start the timer 364 to count up an elapsed time when the variation ΔDA is equal to or larger than the limit value AK, while it may clear the timer 364 when the variation ΔDA is less than the limit value AK.

The timer 364 is electrically connected to the first comparator 363 to receive the timer start signal and start to count up an elapsed time when it receives the timer start signal.

The second memory 365 stores a predetermined period TK for judging abnormality of the select device. The predetermined period TK is set allowing for drive current application time to shift the select lever to an adjacent select position at the maximum current level.

The comparator 366 is electrically connected to the timer 364 and the second memory 365 and compares the elapsed time to the predetermined period TK. When it judges that the elapsed time is within the predetermined period TK, it outputs an abnormal state judgment signal for allowing a drive command value signal outputted by a drive command value calculating part 31" to pass therethrough, while, when it judges that the elapsed time is equal to or larger than the predetermined period TK, it outputs the abnormal state judgment signal for prohibiting passing-through of the signal.

The other parts of the operating position select device of the fifth embodiment are similar to those of the first and fourth embodiments.

Figure 20:
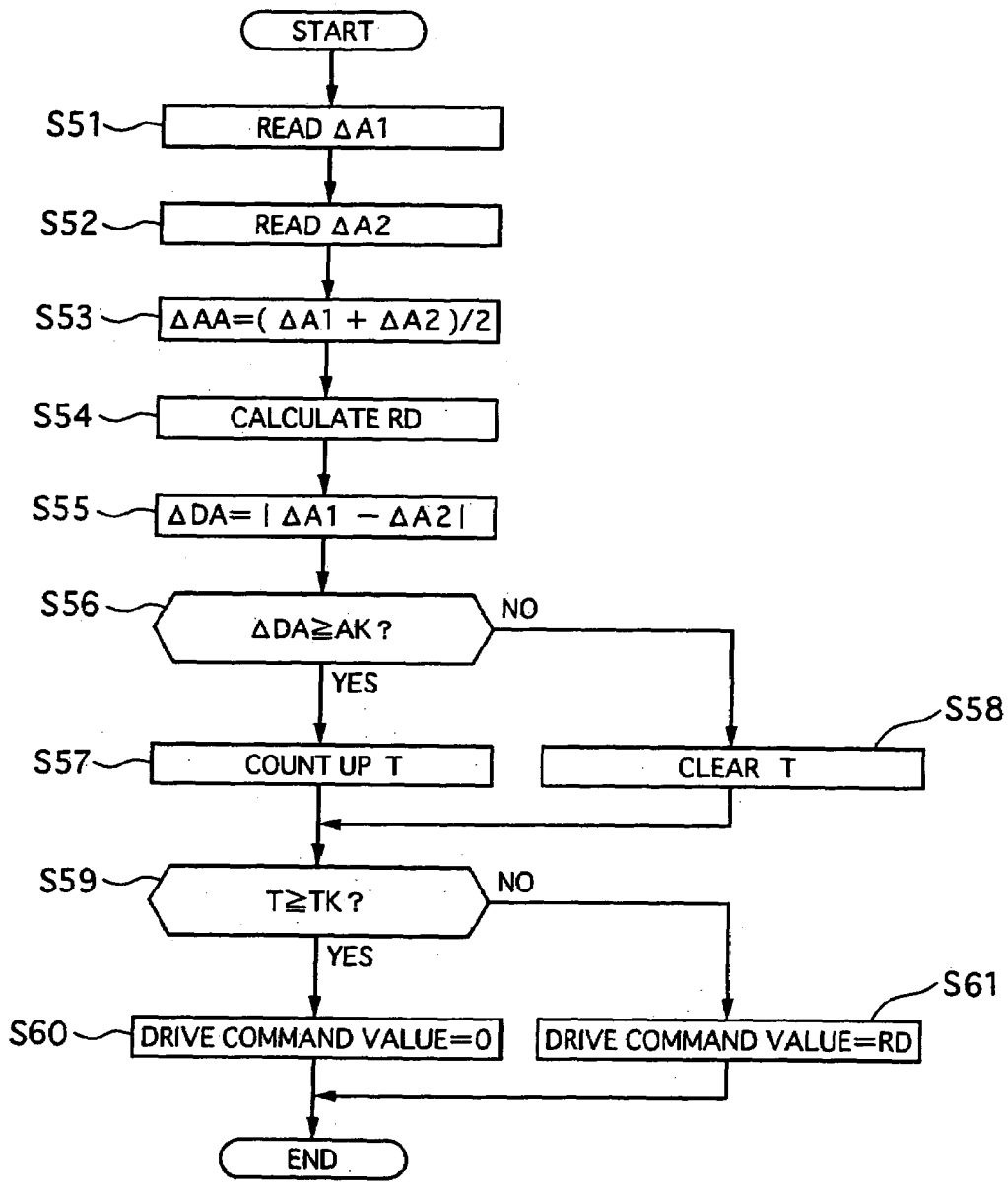
FIG. 20 is a flowchart of a system abnormal diagnosis process executed in the control unit shown in FIG. 18.

FIG. 20 is a flowchart of an abnormal diagnosis process executed by the control unit 3 in order to control the motor 2 when a select lever 11 is operated by a driver.

At step S51, the relative displacement average value calculating part 37 receives a first relative angle signal from the first relative angle sensor 64, and then the flow goes to step S52.

At the step S52, the average value calculating part 37 also receives a second relative angle signal from the second relative angle sensor 65, and then the flow goes to step 53.

At the step S53, the average value calculating part 37 calculates a relative displacement average value ΔAA by using an equation of (ΔA1+ΔA2)/2 based on a first relative angle ΔA1 and a second relative angle ΔA2, and then the flow goes to step S54.

At the step S54, the drive command value calculating part 31" receives the average value ΔAA to calculate a duty ratio RD as a drive command value, and then the flow goes to step S55.

At the step S55, the relative displacement variation calculating part 361 receives the first and second relative angle signals from the first and second relative angle sensors 64 and 65 to calculate a numerical value ΔDA (=|ΔA1−ΔA1|) of a variation between the relative angles ΔA1 and ΔA2, and then the flow goes to step S56.

At the step S56, the first comparator 363 compares the numerical value ΔDA of the variation and the limit value AK to judge whether or no the numerical value ΔDA is equal to or larger than the limit value AK. If YES, the flow goes to step S57, while, if NO, it goes to step S58.

At the step S57, the timer 364 starts to count up an elapsed time T, and then the flow goes to step S59.

At the step S58, the timer 364 clears the elapsed time T, and then the flow goes to the step S59.

At the step S59, the second comparator 363 compares the elapsed time T and the predetermined period TK to judge whether or no the elapsed time T is equal to or larger than the predetermined period TK. If YES, the flow goes to step S60, while, if NO, it goes to step S61.

At the step S60, the drive prohibiting part 34 outputs the drive command value signal set to be zero, and then the flow ends.

At the step S61, the drive prohibiting part 34 outputs directly the drive command value signal inputted from the calculating part 31", and then the flow ends.

In this embodiment, a high level of confidence in measurement of the relative displacement between the first and second connecting members can be obtained by using two relative angle sensors 64 and 65 and calculating their average value.

In a case where one of the sensors 64 and 65 has abnormality, using the average value can decrease affection on the drive command value for driving the motor 2.

By comparing the relative angle signals, abnormality can be detected when their variation becomes larger than a predetermined value that is not detected in normal states of them.

Incidentally, an instantaneous abnormality due to noise or the like, both the sensors 64 and 65 hardly ever become an abnormal state similar to each other. Accordingly, the instantaneous abnormality can be distinguished from other type abnormality based on duration of their abnormal variation. When the abnormal variation is instantaneously short, it is due to the noise or the like, while when the variation continues for more than a certain amount of time.

The operating position select device of the fifth embodiment has the following advantages in addition to those of the first and fifth embodiments.

Further, since this device has two relative displacement sensor 64 and 65, level of confidence for detecting a relative displacement can be increased. In addition, the relative displacement can be surely detected when one of the sensors 64 and 65 fails.

Next, an operating position select device of a sixth embodiment according to the present invention will be described with reference to the accompanying drawing of FIG. 21.

In this select device of the sixth embodiment, an electric motor 2 and a second connecting member 17 are mounted on an automatic transmission 5.

Figure 21:
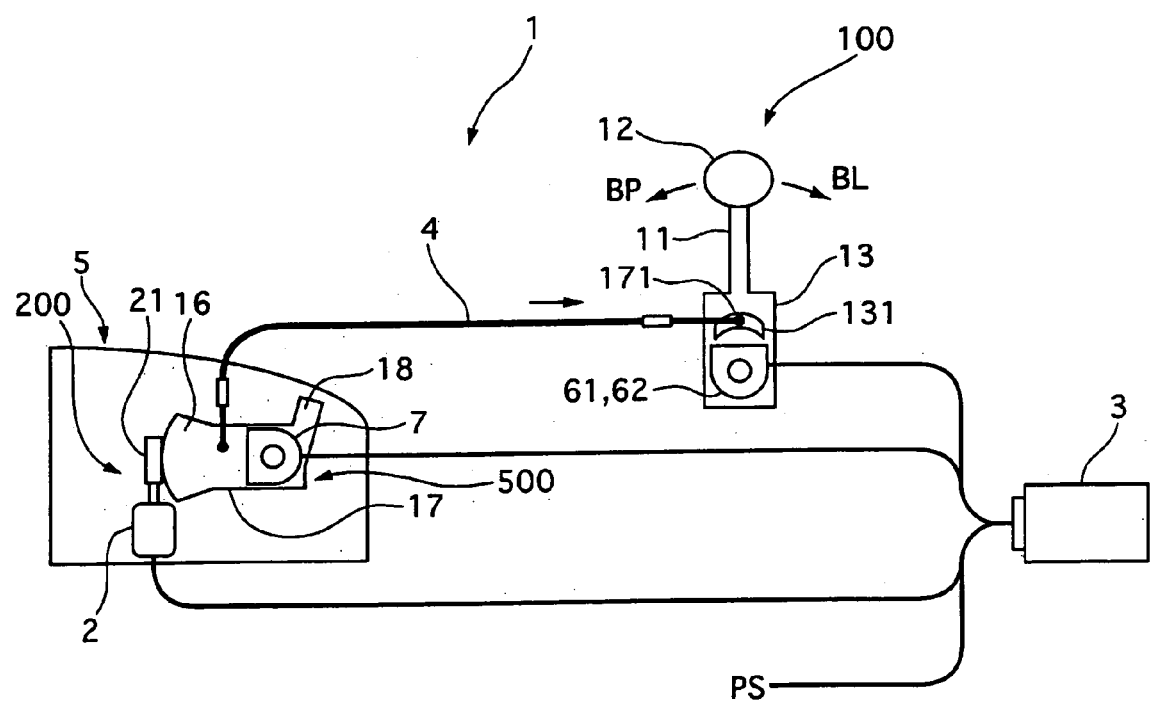
FIG. 21 is a schematic diagram showing a structure of an automatic transmission with an operating position select device of a sixth embodiment according to the present invention.

Referring to FIG. 21, this operating position select device is constructed similarly to that of the first embodiment shown in FIGS. 1 to 4 except the following elements.

A first connecting member 13 is integrally joined with a select lever 11 of a select lever unit 100 and provided with a play opening 131.

The second connecting member 17 is mounted on the automatic transmission 5 and has a worm wheel portion 16 in mesh with a worm 21 connected on an output shaft of an electric motor 2 mounted on the automatic transmission 5. This member 17 is integrally formed with a manual plate member 18 at its end portion.

A control cable 4 has a projection 171 inserted into the play opening 131 with clearances therebetween at its one end portion and is connected with the second connecting member 17 at its other end portion.

The other parts of the operating position select device of the sixth embodiment are similar to those of the first to fifth embodiments.

The operation and advantages of the select device 1 of the sixth embodiment are similar to those of the first to fifth embodiments. Further, the select lever unit 100 can be smaller than those of the embodiments, since the second connecting member 17 and the motor 2 are mounted on the automatic transmission 5.

Next, an operating position select device of a seventh embodiment according to the present invention will be described with reference to the accompanying drawings of FIGS. 22 and 23.

In this select device 1 of the seventh embodiment, the relative displacement is detected by a length, not by an angle in the fourth embodiment, and at a position between a first control cable 8a and a second control cable 8b which connect a select lever 11 with an actuator 9.

Figure 22:
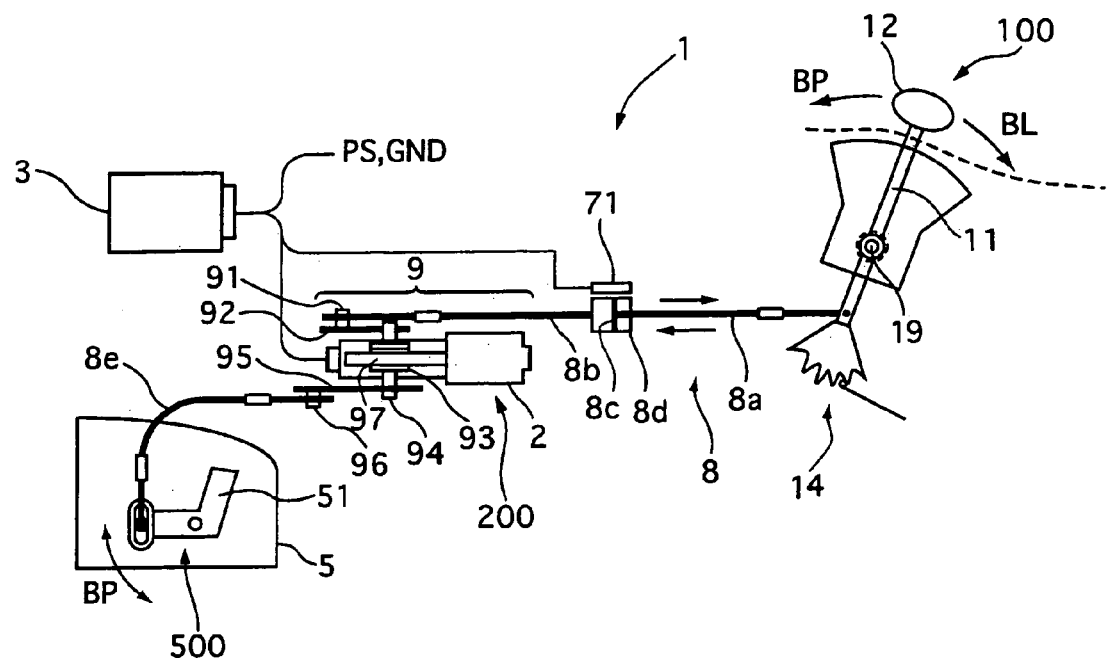
FIG. 22 is a schematic diagram showing a structure of an automatic transmission with an operating position select device of a seventh embodiment according to the present invention.

Referring to FIG. 22 of the drawing, there is shown an automatic transmission 5 and an operating position select device 1 to control the transmission 5.

The operating position select device 1 includes a select lever unit 100 manually operated by a driver, a mode shift unit 500 mounted on the automatic transmission 5, a first control cables 8a, a second control cable 8b, and a third control cable 8e for transmitting operating force from the select lever 11 to the mode shift unit 500, the assist actuator 9, and a control unit 3 for controlling the assist actuator 9.

The select lever unit 100 is arranged, for example, at a center console 3 beside a driver's seat and has the select lever 11 operated by the driver and a checking mechanism 14 for ensuring the select lever 11 to be kept in a selected mode position.

Figure 23:
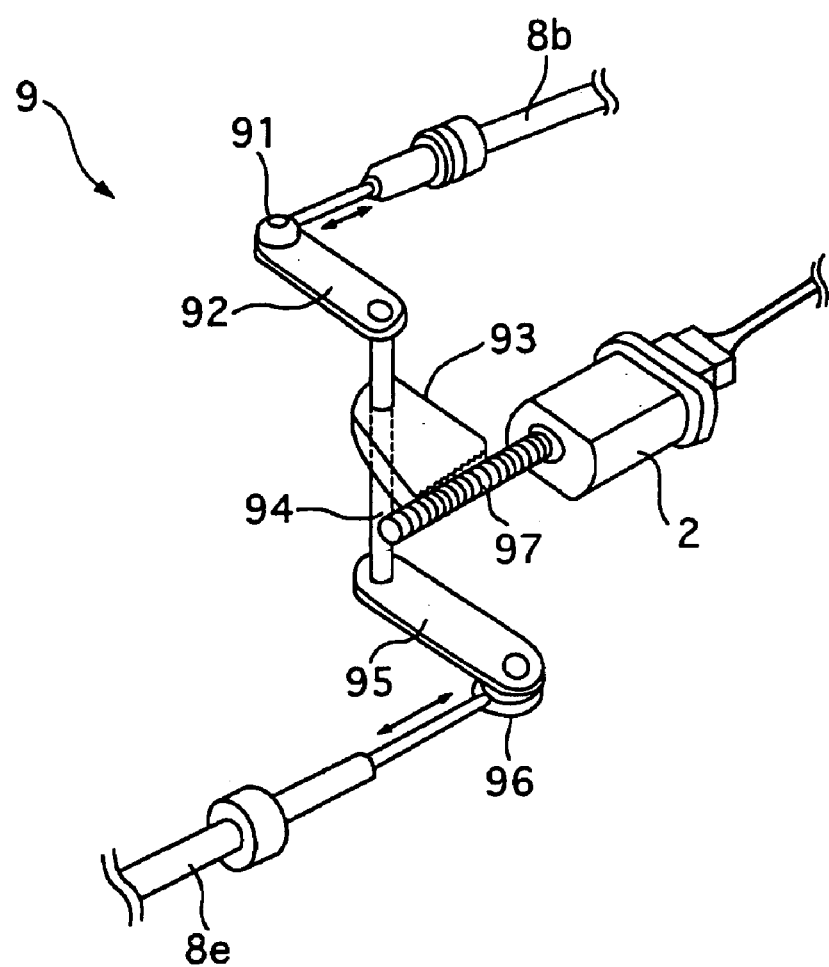
FIG. 23 is an enlarged perspective view showing an assist actuator used in the operating position select device shown in FIG. 22.

Referring to FIGS. 22 and 23, the assist actuator 9 includes an electric motor 2 with reduction gears for reducing rotation speed of its output shaft, a worm 97 formed on the output shaft, and a worm wheel 93 meshing with the worm 97 and integrally united to a coupling shaft 94. The coupling shaft 94 is integrally provided with the worm wheel 93 at its intermediate portion, a first plate 92 at its top end portion, and a second plate 95 at its bottom end portion.

The first control cable 8a is connected with a bottom portion of the select lever at its one end portion and a piston 8c at its other end portion. The second control cable 8b is connected with a cylinder 8d at its one end portion and the first plate 92 by a first pin 91 at its other end portion. The piston 8c is disposed slidably in the cylinder 8d to have clearances between wall portions of the cylinder 8d, so that the first control cable 8a can move relative to the second control cable 8b in a permissible range, where the piston 8c is not in contact with the wall portions of the cylinder 8d. The first and second control cables 8a and 8b moves together with each other to transmit operating force therebetween when the piston 8c is in contact with the wall portion of the cylinder 8d. The third control cable 8e is connected with the second plate 95 by a second pin 96 at its one end portion and a manual plate lever 51 at its other end portion.

There is provided a relative displacement sensor 71 for detecting a relative displacement between the piston 8c and a middle point of the inside of the cylinder 8d.

The operation and advantages of the select device 1 of the seventh embodiment are similar to those of the first to fifth embodiments. Further, the select lever unit 100 can be smaller than those of the embodiments, since the second connecting member 17 and the motor 2 are disposed between the select lever unit 100 and the automatic transmission 5.

While there have been particularly shown and described with reference to preferred embodiments thereof, it will be understood that various modifications may be made therein, and it is intended to cover in the appended claims all such modifications as fall within the true spirit and scope of the invention.

The first and second connecting members 13 and 17 may be located at a select lever unit, an automatic transmission, or an intermediate position between them.

The select lever 2 may be in a shape different from the above embodiments, and have a configuration different from that of the first embodiment shown in FIGS. 1 and 2, for example, a finger-controllable one.

The configuration of the cam 530 of the detent mechanism 510 may be formed arbitrarily to have different target reaction force.

The entire contents of Japanese Patent Applications (Tokugan) No. 2004-301826 filed Oct. 15, 2004 and No. 2005-016080 filed Jan. 24, 2005 are incorporated herein by reference.

What is claimed is:

1. An operating position select device for an automatic transmission whose operation modes are shiftable, the operating position select device comprising:

a select lever unit having a select lever that is operated by a driver between a plurality of select positions corresponding to the operation modes;

a first connecting member mechanically connected with and movable with the select lever;

an operating position sensor detecting an operating position of the select lever;

a mode shift unit mounted on the automatic transmission to shift operation modes of the automatic transmission;

a second connecting member mechanically connected with the mode shift unit to shift positions thereof, the second connecting member being relatively movable to a limit amount with respect to the first connecting member and integrally movable beyond the limit amount with the first connecting member;

an assist sensor detecting an assist position of the mode shift unit;

an assist actuator supplying assist force to the mode shift unit;

a drive command value calculating means calculating a drive command value for driving the assist actuator based on the operating position and the assist position so that a difference between the operating position and the assist position may be reduced; and a drive prohibiting means for prohibiting drive of the assist actuator when the difference is kept out of a permissible range for a predetermined period during rest of the assist actuator.

2. An operating position select device for an automatic transmission according to claim 1, wherein one of the first connecting member and the second connecting member is provided with a projection and the other of the first connecting member and the second connecting member is formed with a play opening in which the projection is inserted, and wherein the play opening is defined by two wall portions arranged apart in a moving direction of the select lever so that the projection is apart from the wall portions in a normal select operation and contacts with one of the wall portions to transmit operating force from the select lever to the mode shift unit when in an abnormal select operation.

3. An operating position select device for an automatic transmission whose operation modes are shiftable, the operating position select device comprising:

a select lever unit having a select lever that is operated by a driver between a plurality of select positions corresponding to the operation modes;

a first connecting member mechanically connected with and movable with the select lever;

an operating position sensor detecting an operating position of the select lever;

a mode shift unit mounted on the automatic transmission to shift operation modes of the automatic transmission;

a second connecting member mechanically connected with the mode shift unit to shift positions thereof, the second connecting member being relatively movable to a limit amount with respect to the first connecting member and integrally movable beyond the limit amount with the first connecting member;

an assist position sensor detecting an assist position of the mode shift unit;

a shifted operating position sensor detecting a shifted operating position of the automatic transmission;

an assist actuator supplying assist force to the mode shift unit;

a drive command value calculating means calculating a drive command value for driving the assist actuator based on the operating position and the assist position so that a difference between the operating position and the assist position may be reduced; and a drive prohibiting means for prohibiting drive of the assist actuator when a difference between the shifted operating position and one of the operating position and the assist position is kept out of a permissible range for a predetermined period during rest of the assist actuator.

4. An operating position select device for an automatic transmission according to claim 3, wherein one of the first connecting member and the second connecting member is provided with a projection and the other of the first connecting member and the second connecting member is formed with a play opening in which the projection is inserted, and wherein the play opening is defined by two wall portions arranged apart in a moving direction of the select lever so that the projection is apart from the wall portions in a normal select operation and contacts with one of the wall portions to transmit operating force from the select lever to the mode shift unit when in an abnormal select operation.

5. An operating position select device for an automatic transmission according to claim 3, wherein the shifted operating position sensor is an inhibitor switch of the automatic transmission.

6. An operating position select device for an automatic transmission whose operation modes are shiftable, the operating position select device comprising:

a select lever unit having a select lever that is operated by a driver between a plurality of select positions corresponding to the operation modes;

a first connecting member mechanically connected with and movable with the select lever;

a mode shift unit mounted on the automatic transmission to shift operation modes of the automatic transmission;

a second connecting member mechanically connected with the mode shift unit to shift positions thereof, the second connecting member being relatively movable to a limit amount with respect to the first connecting member and integrally movable beyond the limit amount with the first connecting member;

a relative displacement sensor detecting a relative displacement between the first connecting member and the second connecting member;

an assist actuator arranged between the select lever and the mode shift unit and supplying assist force to the mode shift unit;

a drive command value calculating means calculating a drive command value for driving the assist actuator based on the relative displacement so that the relative displacement may be reduced; and a drive prohibiting means for prohibiting drive of the assist actuator when the relative displacement is kept out of a permissible range for a predetermined period during rest of the assist actuator.

7. An operating position select device for an automatic transmission according to claim 6, wherein one of the first connecting member and the second connecting member is provided with a projection and the other of the first connecting member and the second connecting member is formed with a play opening in which the projection is inserted, and wherein the play opening is defined by two wall portions arranged apart in a moving direction of the select lever so that the projection is apart from the wall portions in a normal select operation and contacts with one of the wall portions to transmit operating force from the select lever to the mode shift unit when in an abnormal select operation.

* * * * *